US 11,409,966 B1

United States Patent
Phand et al.

(10) Patent No.: US 11,409,966 B1
(45) Date of Patent: Aug. 9, 2022

(54) AUTOMATED TRENDING INPUT RECOGNITION AND ASSIMILATION IN FORECAST MODELING

(71) Applicant: SAS Institute Inc., Cary, NC (US)

(72) Inventors: Anand Arun Phand, Pune (IN); Sudeshna Guhaneogi, Pune (IN); Narender Ceechamangalam Veeraraghavan, Pune (IN); Ravinder Singh Chauhan, Pune (IN); Shikha Bhat, Pune (IN); Kaustubh Yashvant Khandwe, Pune (IN); Shalini Sinha, Pune (IN); Vineet Roy, Pune (IN); Alina Olegovna Asadullina, Moscow (RU); Vitaly Igorevich Plekhanov, Moscow (RU); Elizaveta Alekseevna Lavrenova, Moscow (RU); Dmitry Sergeevich Bodunov, Moscow (RU); Assol Raufjonovna Kubaeva, Moscow (RU); Stephen Joseph Ondrik, Waterdown (CA); Steffen-Horst Schlüter, Filderstadt (DE); Joseph Michael Martino, Apex, NC (US); John Zhiqiang Zhao, Apex, NC (US); Pravinkumar Bhalerao, Morrisville, NC (US); Valentina Larina, Moscow (RU)

(73) Assignee: SAS INSTITUTE INC., Cary, NC (US)

( * ) Notice: Subject to any disclaimer, the term of this patent is extended or adjusted under 35 U.S.C. 154(b) by 0 days.

(21) Appl. No.: 17/554,281

(22) Filed: Dec. 17, 2021

(51) Int. Cl.
*G06F 40/40* (2020.01)
*G06V 30/19* (2022.01)
(Continued)

(52) U.S. Cl.
CPC .......... *G06F 40/40* (2020.01); *G06F 16/9532* (2019.01); *G06N 3/086* (2013.01); *G06V 30/19147* (2022.01)

(58) Field of Classification Search
None
See application file for complete search history.

(56) References Cited

U.S. PATENT DOCUMENTS 6,996,575 B2   2/2006   Cox et al.
7,251,589 B1   7/2007   Crowe et al.
(Continued)

OTHER PUBLICATIONS

Arias M, Arratia A, Xuriguera R. Forecasting with twitter data. ACM Transactions on Intelligent Systems and Technology (TIST). Jan. 3, 2014;5(1):1-24. (Year: 2014).*
(Continued)

*Primary Examiner* — Vincent Gonzales
(74) *Attorney, Agent, or Firm* — KDB Firm PLLC

(57) ABSTRACT

An apparatus to: analyze a data set to identify a candidate topic not in a set of topics; determine whether the prominence of the candidate topic within the data set meets a threshold; in response to meeting the threshold, retrieve a rate of increase in frequency of the candidate topic in online searches; in response to meeting a threshold rate of increase, retrieve the keyword most frequently used in online searches for the candidate topic, use the keyword to retrieve a supplemental data set, and analyze input data extracted from the supplemental data set to determine whether the candidate topic can change the accuracy of a forecast model; and in response to determining that the candidate topic can change the accuracy, add the candidate topic to the set of topics and replace the forecast model with a forecast model trained for the set of topics augmented with the candidate topic.

30 Claims, 18 Drawing Sheets

(51) Int. Cl.
　　　*G06N 3/08*　　　(2006.01)
　　　*G06F 16/9532*　　(2019.01)

(56) References Cited

U.S. PATENT DOCUMENTS

| | | |
|---|---|---|
| 7,711,734 B2 | 5/2010 | Leonard |
| 8,014,983 B2 | 9/2011 | Crowe et al. |
| 8,832,015 B2 | 9/2014 | Cox et al. |
| 9,047,559 B2 | 6/2015 | Brzezicki et al. |
| 9,087,306 B2 | 7/2015 | Leonard et al. |
| 9,244,887 B2 | 1/2016 | Leonard et al. |
| 9,280,747 B1 | 3/2016 | Jin et al. |
| 9,582,761 B2 | 2/2017 | Cox et al. |
| 10,169,720 B2 | 1/2019 | Chien et al. |
| 10,331,490 B2 | 6/2019 | Leonard et al. |
| 10,366,117 B2 | 7/2019 | Mills et al. |
| 10,467,550 B1 * | 11/2019 | Gupta .................... G06N 20/00 |
| 10,685,283 B2 | 6/2020 | Li et al. |
| 10,860,809 B2 | 12/2020 | Cox et al. |
| 2016/0275399 A1 | 9/2016 | Leonard et al. |
| 2017/0228661 A1 | 8/2017 | Chien et al. |
| 2017/0236132 A1 | 8/2017 | Haxholdt et al. |

OTHER PUBLICATIONS

Ritterman J, Osborne M, Klein E. Using prediction markets and Twitter to predicta swine flu pandemic. In 1st international workshop on mining social media Nov. 9, 2009 (vol. 9, pp. 9-17). (Year: 2009).*

* cited by examiner

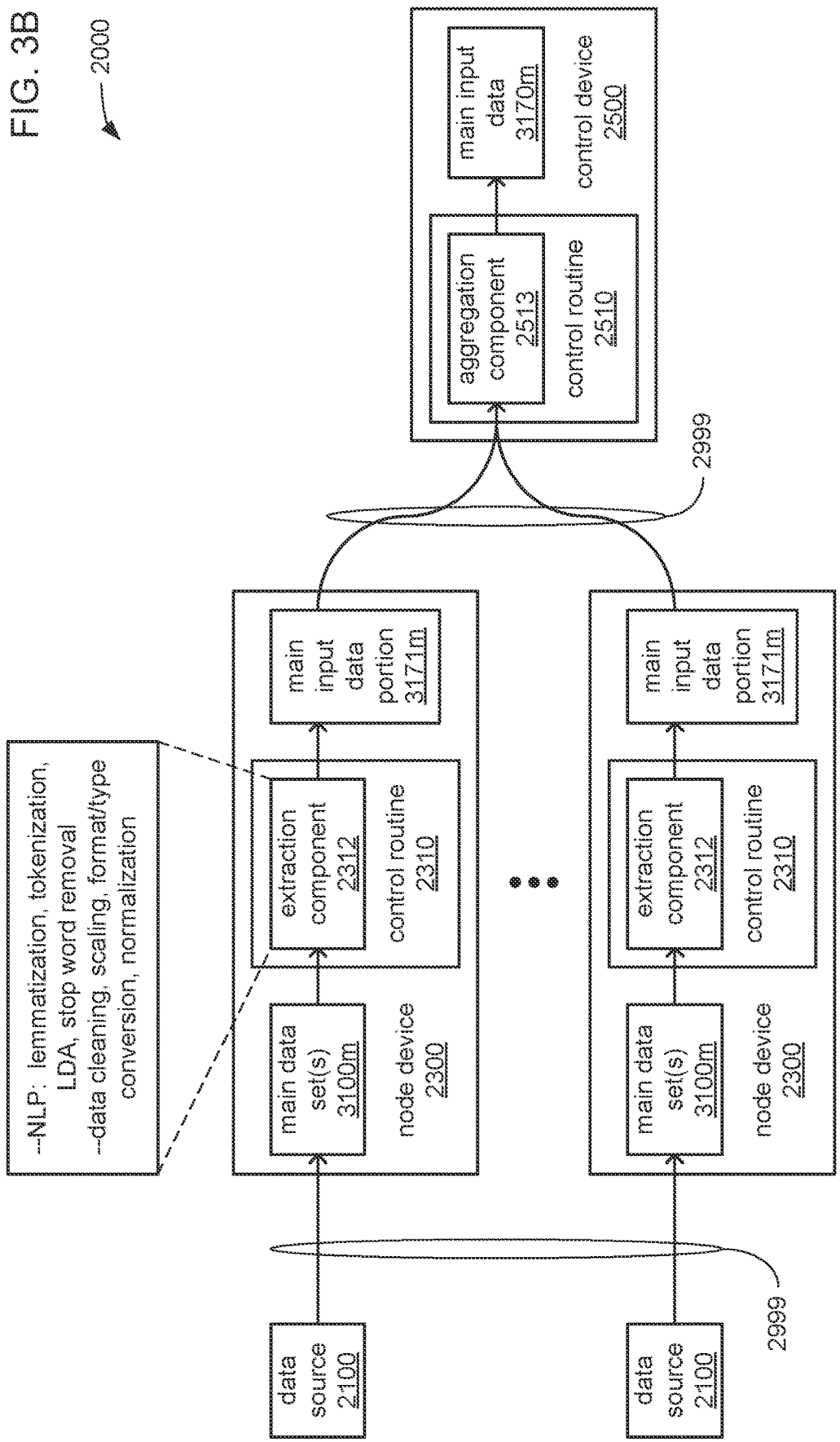

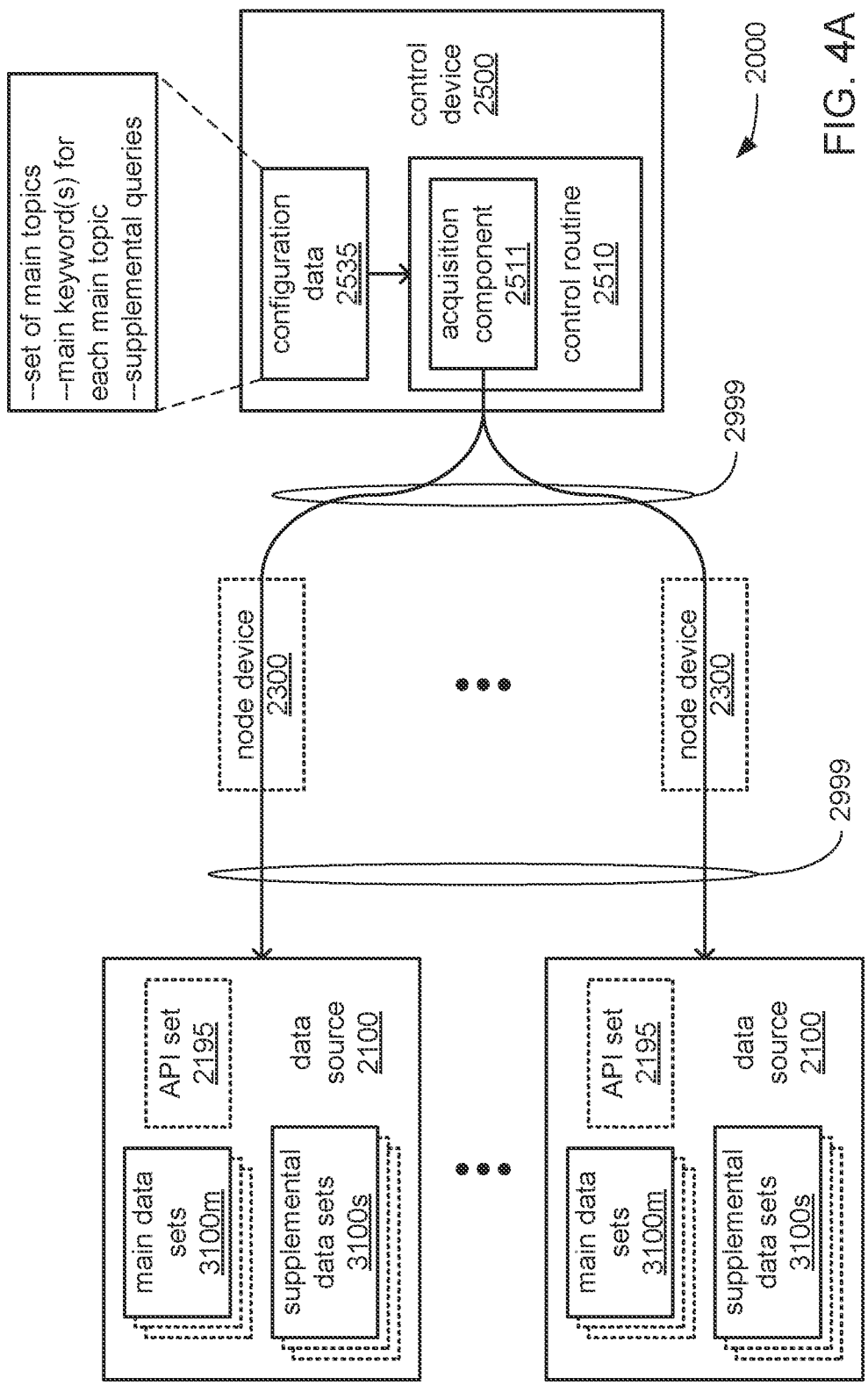

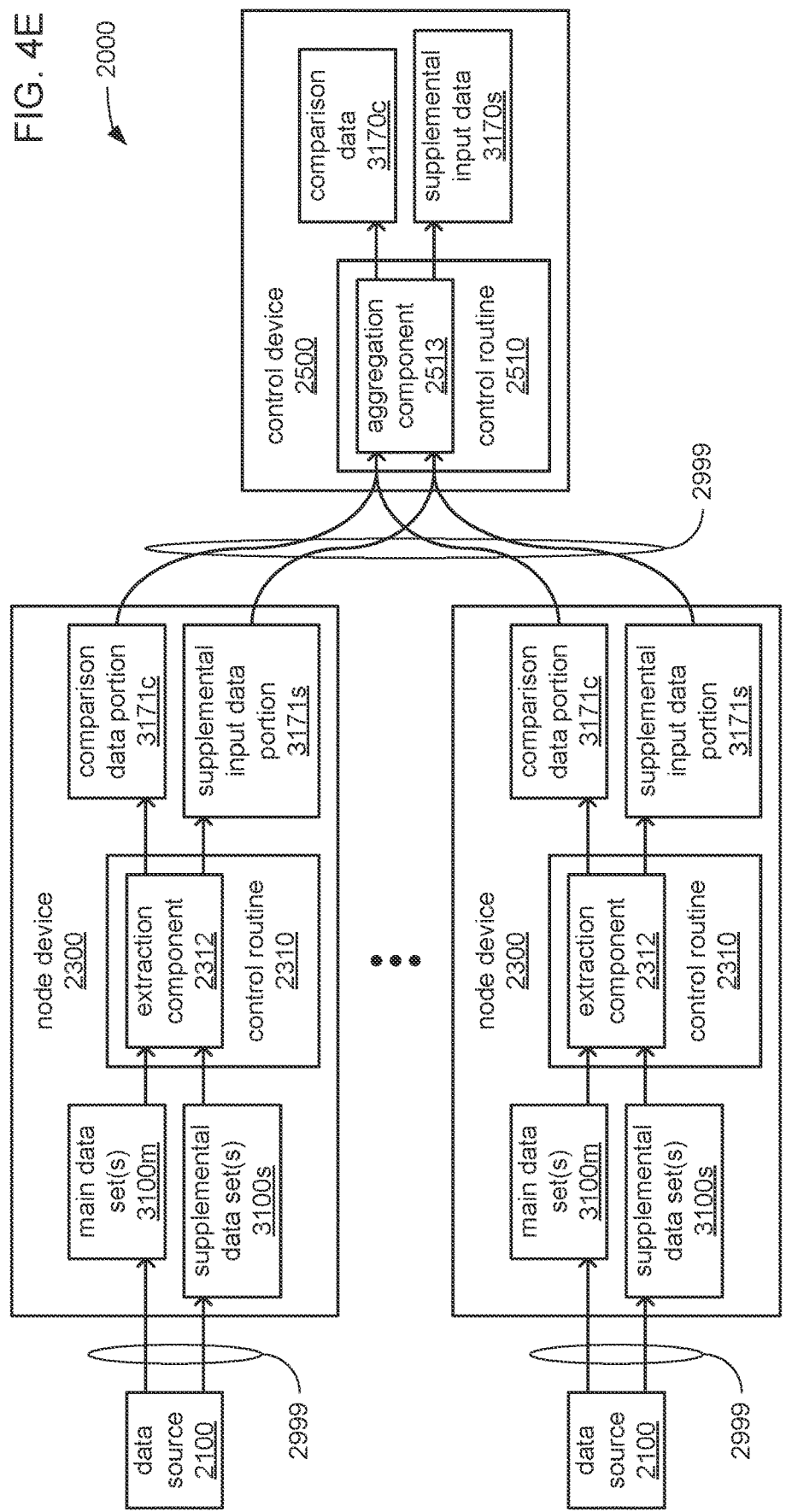

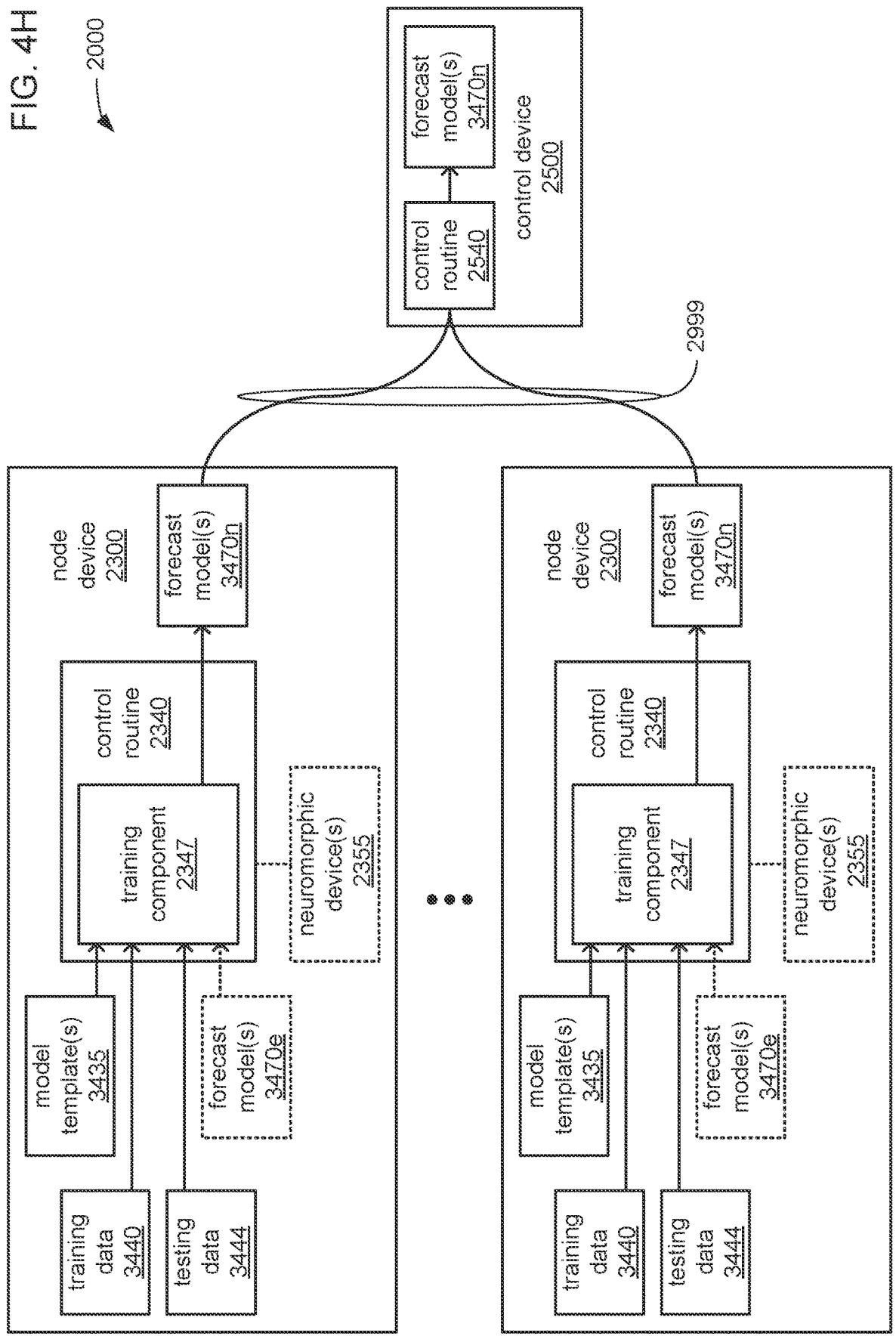

AUTOMATED TRENDING INPUT RECOGNITION AND ASSIMILATION IN FORECAST MODELING

CROSS-REFERENCE TO RELATED APPLICATIONS

This application is a continuation of, and claims the benefit of foreign priority under 35 U.S.C. § 119 to, Indian Provisional Patent Application No. 202111038737 filed Aug. 26, 2021 in the Indian Patent Office, and entitled "Automated Trending Input Recognition and Assimilation in Forecast Modeling", which is incorporated herein by reference in its entirety for all purposes.

TECHNICAL FIELD

Various embodiments are generally directed to techniques for improving the accuracy of model-based forecasts in quickly changing circumstances.

BACKGROUND

It has become commonplace to use various models to generate forecasts for weather and/or geological phenomena, actions taken by populations, operating conditions of large scale systems, logistics planning, resource allocation, etc. Such models often rely on learned correlations associated with causally related events occurring over time in making such forecasts. Some of such models may be based on any of a variety of types of machine learning (ML) in which such models are trained using training data to learn such correlations. Such training data is usually taken from, or otherwise derived from, data sets of real world observations of various aspects of past events. As a result, the ability of such models to generate accurate forecasts is usually limited by the amount and variety of correlated past events included therein. Thus, if training data does not include any instance of a particular type of past event, or does not include any instance of a particular type of correlation between past events, then it is unlikely that such training data will prepare a model to recognize and take into account the onset of a new instance of that particular type of event, or the onset of a new instance of that particular correlation, thereby likely leading to greater forecast inaccuracies.

As will be familiar to those skilled in the art, ML-based forecast models are often used to predict events associated with relatively complex systems. Such complexity often renders it difficult to identify the full variety of inputs that should be used to enable highly accurate forecasts. There is also usually a need to make a tradeoff between the time and resources required in implementing a forecast model, and the variety of inputs and period of time covered for each input. A greater variety of inputs and/or a longer period of time covered for each input results in a greater overall quantity of input data to a forecast model, and this necessitates a larger and more complex forecast model requiring greater computing resources and/or more time to generate each forecast. Thus, there is often impetus to limit the variety of inputs and/or the length of periods of time covered by each input to just what is needed to regularly achieve a desired minimum degree of accuracy in the resulting forecasts.

As will also be familiar to those skilled in the art, the training of ML-based forecast models can also consume considerable time and/or computing resources, such that there can be an impetus to limit the size of the training data used to be no greater than needed to regularly achieve the desired degree of accuracy in making forecasts. By way of example, it logically follows that the training data for an ML-based forecast model will be limited in its variety of inputs to be no greater than the variety of inputs that will normally be used in making forecasts.

However, as past experience has shown, the imposition of such limits on the training and complexity of a forecast model arising from such tradeoffs can easily result in the forecast model occasionally generating forecasts with a relatively low degree of accuracy in situations in which unusual events take place such that new causal relationships have been created that were not considered in the creation of the forecast model. A recent example of this is the onset of the COVID-19 disease pandemic in early 2020 caused by the spread of the SARS-CoV-2 coronavirus. Many normal patterns of behavior in the usage of utilities (e.g., electricity, water, telecommunications, Internet communications, natural gas, etc.), shipping needs (both residential and commercial shipping), agricultural needs, climate change mechanisms, monetary systems, etc., were disrupted in ways not predicted by many of the forecast models normally relied upon to improve planning efforts associated with these and many other complex systems. This event revealed that conventional approaches to creating and using forecast models were insufficient in adapting to the onset of such an event.

SUMMARY

This summary is not intended to identify only key or essential features of the described subject matter, nor is it intended to be used in isolation to determine the scope of the described subject matter. The subject matter should be understood by reference to appropriate portions of the entire specification of this patent, any or all drawings, and each claim.

An apparatus includes at least one processor and a storage to store instructions that, when executed by the at least one processor, cause the at least one processor to perform operations including: retrieve, from at least one data source device via a network, at least one main data set that includes main input data associated with a pre-selected set of main topics; analyze the at least one main data set to identify a candidate topic present within the at least one main data set, wherein the candidate topic is not included in the set of main topics, and at least one existing forecast model is trained to use the main input data to generate a forecast concerning a pre-selected subject; analyze the at least one data set to determine whether a level of prominence of the candidate topic within the at least one data set meets a pre-determined minimum threshold level of prominence; and in response to at least the level of prominence meeting a minimum threshold level of prominence, retrieve, via the network and from another device that performs online searches, an indication of a rate of increase in frequency with which the candidate topic is included in the online searches. The at least one processor is also caused to, in response to the rate of increase meeting a pre-determined minimum threshold rate of increase in frequency, perform operations including: retrieve, via the network and from the other device, an indication of a supplemental keyword most frequently used in the online searches for the candidate topic; use the supplemental keyword to retrieve, from the at least one data source device via the network, at least one supplemental data set that includes the candidate topic; extract supplemental input data associated with the candidate topic from the at least one supplemental data set; and analyze the supplemental input data together with observations of a level of forecast accuracy of the at least one existing forecast model to determine whether the candidate topic is able to change the level of forecast accuracy. The at least one processor is further caused to, in response to a determination that the candidate topic is able to change the level of forecast accuracy, perform operations including: add the candidate topic to the set of main topics; and replace the at least one existing forecast model with at least one new forecast model trained to use the main input data augmented with the supplemental input data to generate a new forecast concerning the pre-selected subject.

A computer-program product tangibly embodied in a non-transitory machine-readable storage medium includes instructions operable to cause at least one processor to perform operations including: retrieve, from at least one data source device via a network, at least one main data set that includes main input data associated with a pre-selected set of main topics; analyze the at least one main data set to identify a candidate topic present within the at least one main data set, wherein the candidate topic is not included in the set of main topics, and at least one existing forecast model is trained to use the main input data to generate a forecast concerning a pre-selected subject; analyze the at least one data set to determine whether a level of prominence of the candidate topic within the at least one data set meets a pre-determined minimum threshold level of prominence; and in response to at least the level of prominence meeting a minimum threshold level of prominence, retrieve, via the network and from another device that performs online searches, an indication of a rate of increase in frequency with which the candidate topic is included in the online searches. The at least one processor is also caused to, in response to the rate of increase meeting a pre-determined minimum threshold rate of increase in frequency, perform operations including: retrieve, via the network and from the other device, an indication of a supplemental keyword most frequently used in the online searches for the candidate topic; use the supplemental keyword to retrieve, from the at least one data source device via the network, at least one supplemental data set that includes the candidate topic; extract supplemental input data associated with the candidate topic from the at least one supplemental data set; and analyze the supplemental input data together with observations of a level of forecast accuracy of the at least one existing forecast model to determine whether the candidate topic is able to change the level of forecast accuracy. The at least one processor is further caused to, in response to a determination that the candidate topic is able to change the level of forecast accuracy, perform operations including: add the candidate topic to the set of main topics; and replace the at least one existing forecast model with at least one new forecast model trained to use the main input data augmented with the supplemental input data to generate a new forecast concerning the pre-selected subject.

A computer-implemented method includes: retrieving, by at least one processor, and from at least one data source device via a network, at least one main data set that includes main input data associated with a pre-selected set of main topics; analyzing, by the at least one processor, the at least one main data set to identify a candidate topic present within the at least one main data set, wherein the candidate topic is not included in the set of main topics, and at least one existing forecast model is trained to use the main input data to generate a forecast concerning a pre-selected subject; analyzing, by the at least one processor, the at least one data set to determine whether a level of prominence of the candidate topic within the at least one data set meets a pre-determined minimum threshold level of prominence; and in response to at least the level of prominence meeting a minimum threshold level of prominence, retrieving, via the network and from another device that performs online searches, an indication of a rate of increase in frequency with which the candidate topic is included in the online searches. The method also includes, in response to the rate of increase meeting a pre-determined minimum threshold rate of increase in frequency, performing operations including: retrieving, via the network and from the other device, an indication of a supplemental keyword most frequently used in the online searches for the candidate topic; using, by the at least one processor, the supplemental keyword to retrieve, from the at least one data source device via the network, at least one supplemental data set that includes the candidate topic; extracting, by the at least one processor, supplemental input data associated with the candidate topic from the at least one supplemental data set; and analyzing, by the at least one processor, the supplemental input data together with observations of a level of forecast accuracy of the at least one existing forecast model to determine whether the candidate topic is able to change the level of forecast accuracy. The method further includes, in response to a determination that the candidate topic is able to change the level of forecast accuracy, performing operations including: adding the candidate topic to the set of main topics; and replacing the at least one existing forecast model with at least one new forecast model trained to use the main input data augmented with the supplemental input data to generate a new forecast concerning the pre-selected subject.

The foregoing, together with other features and embodiments, will become more apparent upon referring to the following specification, claims, and accompanying drawings.

BRIEF DESCRIPTION OF THE DRAWINGS

The present disclosure is described in conjunction with the appended figures:

FIGS. 3A, 3B, 3C, 3D and 3E, together, illustrate aspects of generating a forecast based on input data associated with a preselected set of topics.

FIGS. 4A, 4B, 4C, 4D, 4E, 4F, 4G, 4H and 4I, together, illustrate aspects of retraining forecast models in response to identifying a significant trending topic.

DETAILED DESCRIPTION

Figure 1A:
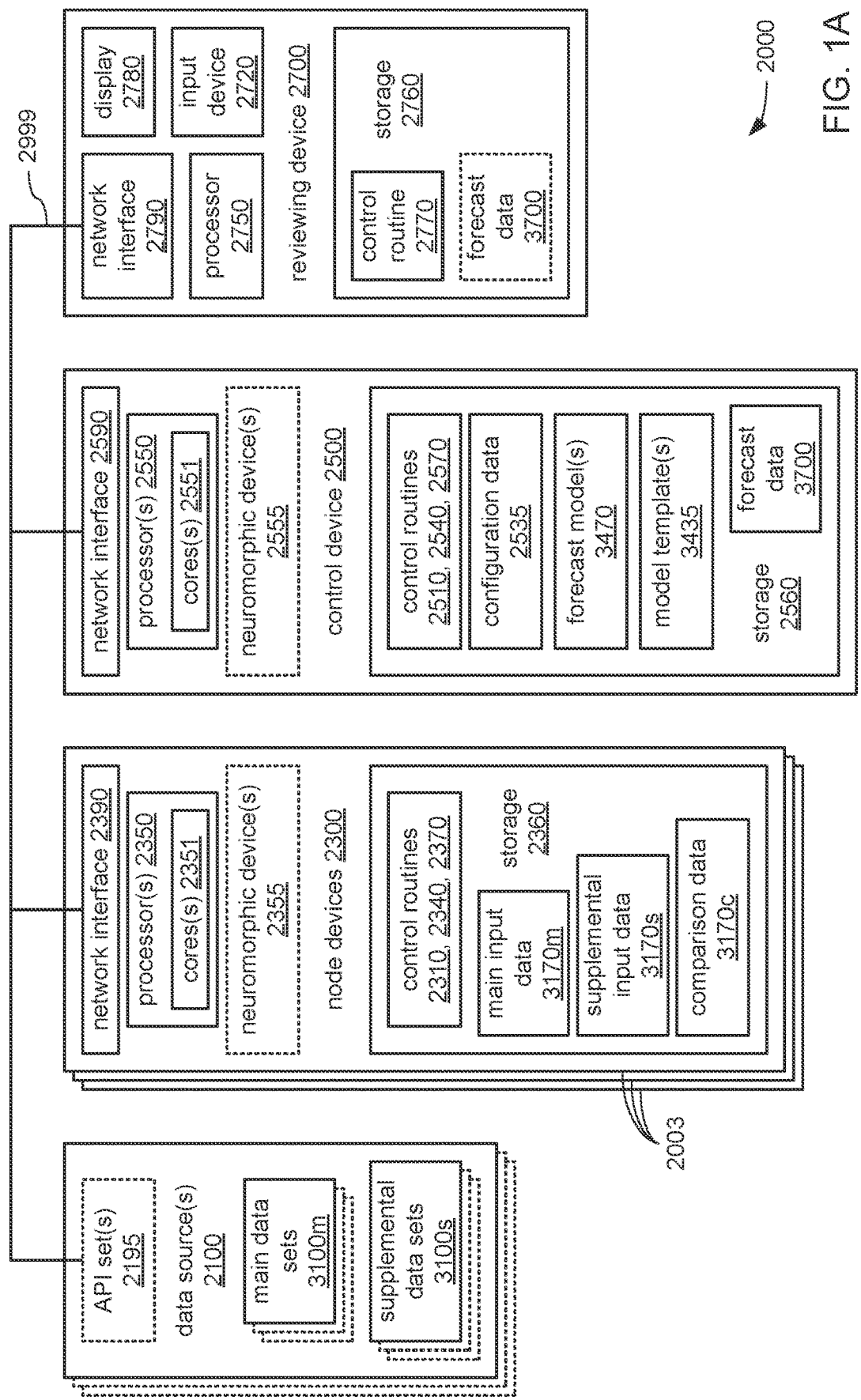
FIGS. 1A and 1B each illustrate an example embodiment of a processing system.

Various embodiments are generally directed to techniques for identifying and using a new and trending input to forecast model(s) to improve forecast accuracy during the onset of new circumstances able to adversely affect forecast accuracy if not taken into account in generating forecasts. Forecasts concerning a particular subject may regularly be made based on main input data that is associated with a set of main input topics, and that is extracted from regularly retrieved main data sets. However, as a mechanism to more quickly adapt to changing circumstances necessitating the use of new input to at least preserve forecast accuracy, searches may also be regularly performed to identify a trending topic to use in supplementing the set of main topics. The addition of such a trending topic may be conditioned on the extent to which the trending topic is found to be trending based on such factors as the frequency with which it is included in online searches, and/or the degree to which it influences the subject about which forecasts are made. In response to the trending topic meeting such requirements, the keyword(s) that are most often used in online searches for the trending topic may be identified, and then used to retrieve supplemental data set(s) associated with the trending topic. Supplemental input data may then be extracted therefrom, and analyzed along with comparison data indicative of observations of data value(s) for the subject about which forecasts are made to determine if there is a causal correlation therebetween.

In response to a determination that such a causal correlation does exist, the trending topic may then be selected for being added to the set of main topics. As a result, new forecast model(s) that use input data associated with the now modified set of main topics may be trained to replace the existing forecast model(s) that use input data associated with the existing set of main topics. It may be that an ensemble of multiple types of candidate forecast model are trained in parallel, and then tested to evaluate their relative forecast accuracies. Such multiple types of candidate forecast models may be collected from multiple sources, and/or may incorporate executable code written in differing programming languages. A single champion model may be selected to generate forecasts, or multiple champion models may be selected for use together as a hybrid combination to do so. Those forecasts may be then be provided as input to a system to enable various automated actions to be preemptively taken. Alternatively or additionally, those forecasts may be presented to operating personnel to aid to decision making.

More specifically, forecasts concerning a particular subject may be made on a recurring basis through use of one or more selected types of forecast model that were previously trained to generate forecasts based on main input data extracted from main data sets recurringly provided by one or more main sources. It may be that the generation of such forecasts is triggered to occur on a regular interval of time and/or in response to other recurring stimulus. The selection of main source(s) may be based on keywords associated with a set of main topics that have been selected as a result of being deemed to be of significance in affecting the subject about which forecasts that are made. By way of example, where the subject is associated with a complex system (e.g., a system for providing a public utility, a system of interacting earthquake faults, an agricultural system, a shipping logistics system, a monetary system, etc.), then the main source(s) may be selected based on a set of main topics that include various factors that are deemed capable of affecting aspects of that complex system (e.g., weather, passage of time, geological activity, economic activity, etc.).

The main data sets may be recurringly provided by the one or more main data sources in response to requests for data sets that each cover one or more of the main topics based on searches using the keywords associated with the set of main topics. In some embodiments, the main data source(s) may provide application programming interfaces (APIs) to serve as a protocol by which requests for data sets based on keywords can be transmitted to the main data sources over a network. In some embodiments, the main data source(s) may directly provide the main data sets, thereby enabling the contents within each to be directly analyzed to derive relative proportions of the presence of different ones of the main topics within each main data set as an input to the performance of data extraction from the main data sets. In other embodiments, such APIs may additionally enable requests to be made for each data set to be analyzed by the main data source(s), thereby enabling some degree of filtering of what main data sets are to be provided before they are provided for the extraction of the main input data therefrom.

Regardless of the exact manner in which the main data sets are identified and/or made available for data extraction, as will be familiar to those skilled in the art, and as will be explained in greater detail, various forms of natural language processing (NLP) and/or any of a variety of other preprocessing operations may be performed on the main data sets as part of extracting the main input data therefrom. The extracted main input data may then be provided as inputs to one or more previously selected existing forecast models for use in the recurring generation of forecasts. Those one or more selected existing forecast models may be so selected based on an earlier evaluation of relative forecast accuracy based on inputs associated with the set of main topics.

However, as previously discussed, there may occasions in which a change in circumstances occurs that at least reduces the ability of the existing forecast model(s) to continue generating forecasts that meet a desired degree of accuracy based on the existing set of main topics. As part of identifying such occasions, the one or more main data sets, and/or one or more supplemental data sets that do not already serve as sources of the main input data, may be analyzed to determine whether there are any topics (beyond the existing set of main topics) that may be trending such that they may be candidates for being added to the existing set of main topics. In some embodiments, the quantity of main topics in the set of main topics may be pre-selected quantity (or a pre-selected range of quantities) such that adding a new topic may necessitate the removal of one of the existing main topics therefrom.

Such an analysis to identify such a trending topic may begin with searching each of the main data sets and/or each of the supplemental data sets to identify topics that are present therein to a degree meeting a predetermined minimum threshold level of prominence, and/or that are present therein with a level of prominence that is increasing over time at a rate meeting a predetermined minimum threshold rate of increase in prominence. In response to identifying a candidate topic meeting such prominence criteria, queries may be provided to one or more data sources to request information concerning the frequency with which such a candidate topic has been included in recent online searches. In some embodiments, the one or more data sources to which such queries may be directed may include the one or more main data sources, and/or may include one or more other data sources (e.g., the one or more supplemental data sources). Also, in some embodiments, APIs provided by one or more data sources may be used as the protocol by which such queries are made.

The responses to such queries concerning online searches may be used to determine whether the candidate topic is being included in online searches with a level of frequency that meets a minimum threshold of frequency, and/or whether that degree of frequency is increasing at a rate that meets a minimum threshold rate of increase in frequency. In response to the candidate topic meeting such frequency criteria such that it may be deemed to be a trending topic, further queries may be made for information concerning the relative frequencies at which various keywords are being used in those online searches, and those relative frequencies may be analyzed to identify the one(s) that are used most frequently. Upon identifying such keyword(s), those keyword(s) may be used in queries to the one or more main data sources, and/or to the one or more supplemental data sources, to retrieve more data sets associated with the trending topic. Various data extraction operations may then be performed to retrieve supplemental input data associated with the trending topic.

In addition to the recurring extraction of the main input data from the main input data sets, there may also be recurring extraction of comparison data from the main input data sets and/or still other data sets. The comparison data may be indicative of the actual data values for the subject about which forecasts are made, and may be used as the ground truth against which those forecasts may be compared on a recurring basis to verify that the one or more existing forecast models are continuing to provide forecasts that are as accurate as desired. However, such comparison data may also be used in an analysis of the supplemental input data for the trending topic to determine whether there is a degree of causal relationship therebetween that meets a minimum threshold degree of causality that the trending topic is able to be deemed to be sufficiently linked to the subject of the forecasts that the trending topic is to be added to the set of main topics used in making forecasts.

In response to a determination that such a causal correlation does exist to such a sufficient degree, the addition of the trending topic to the set of main topics necessitates the replacement of the existing selected forecast model(s) with one or more new forecast models that are trained to use input data associated with the trending topic as an additional input. As will be familiar to those skilled in the art, such a change necessitates training one or more new models with new training data. Such new training data may be assembled from portions of the main input data, the supplemental input data associated with the trending topic and the comparison data that cover corresponding periods of time such that the new training data embodies the causal relationship between the portion of the comparison data and both of the corresponding portions of the main input data and supplemental input data. As will also be familiar to those skilled in the art, corresponding new testing data may also assembled from a similar combination of portions of the main input data, the supplemental input data and the comparison data.

In some embodiments, such new training data may be used to train an ensemble of forecast models representing a variety of types of forecast model, and may be used to do so in parallel. Following such training, the corresponding new testing data may be used to test the relative degrees of accuracy of the forecasts generated by each of the newly trained forecast models. In some embodiments, the ensemble of forecast models may include forecast models from multiple sources (e.g., created by different academic, governmental and/or commercial entities, and/or generated in a more organic manner by individuals). In some of such embodiments, it may be deemed desirable to employ a smaller ensemble of champion forecast models in any of a variety of types of hybrid combination to generate forecasts, based at least partially on determinations of which ones generate more accurate forecasts. By way of example, it may be deemed desirable to define a hybrid combination that includes the most accurate forecast model from each source of forecast models. In other embodiments, it may be that a single forecast model is selected based on its degree of accuracy, and with no regard to its origins.

As part of accommodating the use of forecast models from multiple sources, there may be a need to accommodate forecast models written in differing programming and/or scripting languages. In some embodiments, a model template may be provided for each type of forecast model to provide various pieces of information concerning its corresponding forecast model to better enable its use. Each model template may specify various parameters and/or hyperparameters of its corresponding forecast model, including and not limited to, an indication of programming and/or scripting language in which the forecast model is written and/or what language interpreter required to use the forecast model; storage locations and/or data formats for input data and/or for the forecast output; correlations between main input data values and inputs of the forecast model; executable code to perform one or more initialization and/or other operations to enable use of the forecast model; etc.

As will be familiar to those skilled in the art, the generation of a forecast entails the generation of a set of individual predictions that extend over a period of time that is covered by the forecast such that each prediction is associated with a single point within that period of time. Thus, it should be noted that, in some embodiments, the generation of each forecast may entail the generation of a time series. Additionally, it should be noted that alternate embodiments of what is depicted and described herein are possible that may generate single predictions, rather than forecasts that include multiple predictions.

With general reference to notations and nomenclature used herein, portions of the detailed description that follows may be presented in terms of program procedures executed by a processor of a machine or of multiple networked machines. These procedural descriptions and representations are used by those skilled in the art to most effectively convey the substance of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic or optical communications capable of being stored, transferred, combined, compared, and otherwise manipulated. It proves convenient at times, principally for reasons of common usage, to refer to what is communicated as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include machines selectively activated or configured by a routine stored within that is written in accordance with the teachings herein, and/or include apparatus specially constructed for the required purpose. Various embodiments also relate to apparatus or systems for performing these operations. These apparatus may be specially constructed for the required purpose or may include a general purpose computer. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives within the scope of the claims.

Systems depicted in some of the figures may be provided in various configurations. In some embodiments, the systems may be configured as a distributed system where one or more components of the system are distributed across one or more networks in a cloud computing system and/or a fog computing system.

Figure 1B:
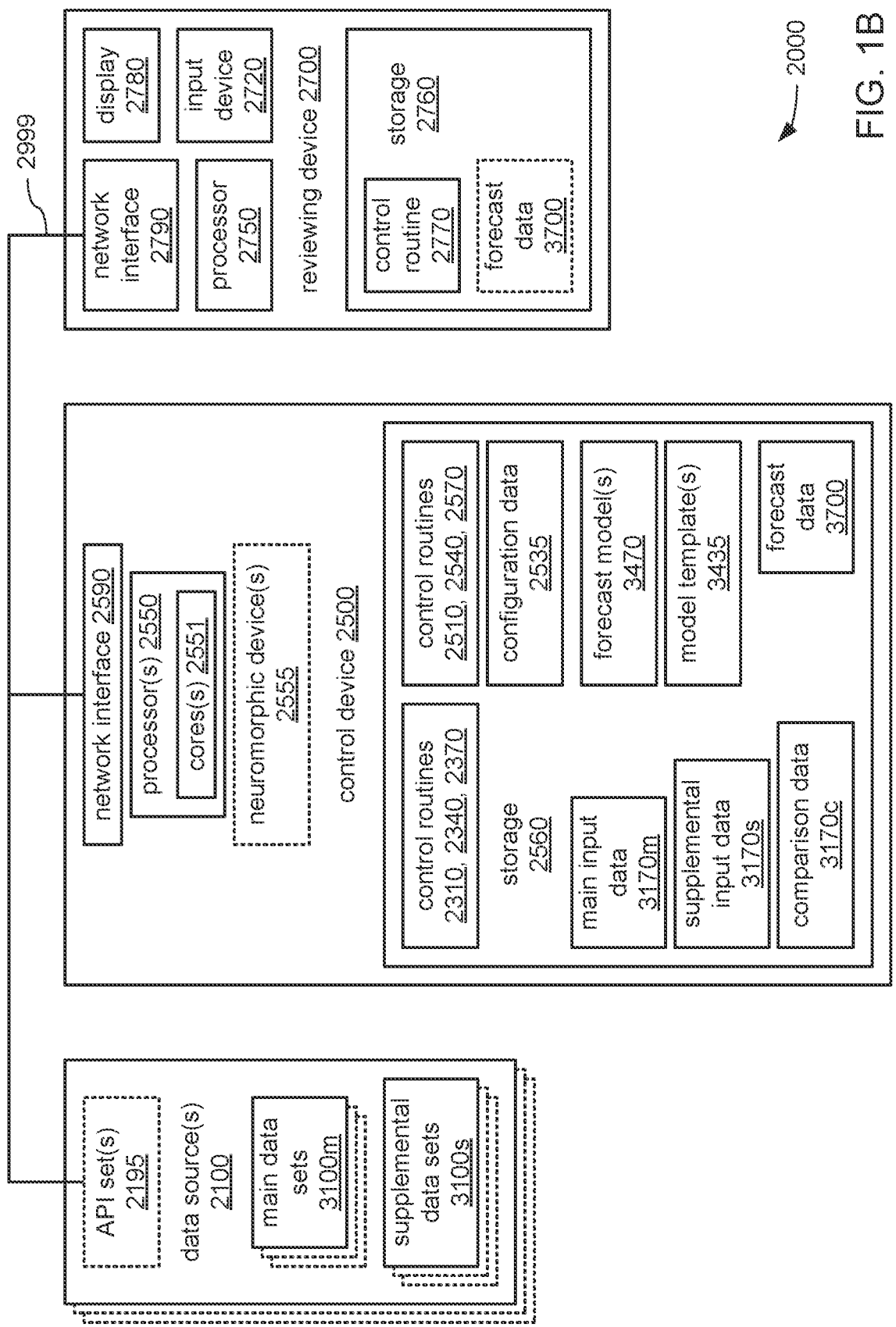
Figure 2A:
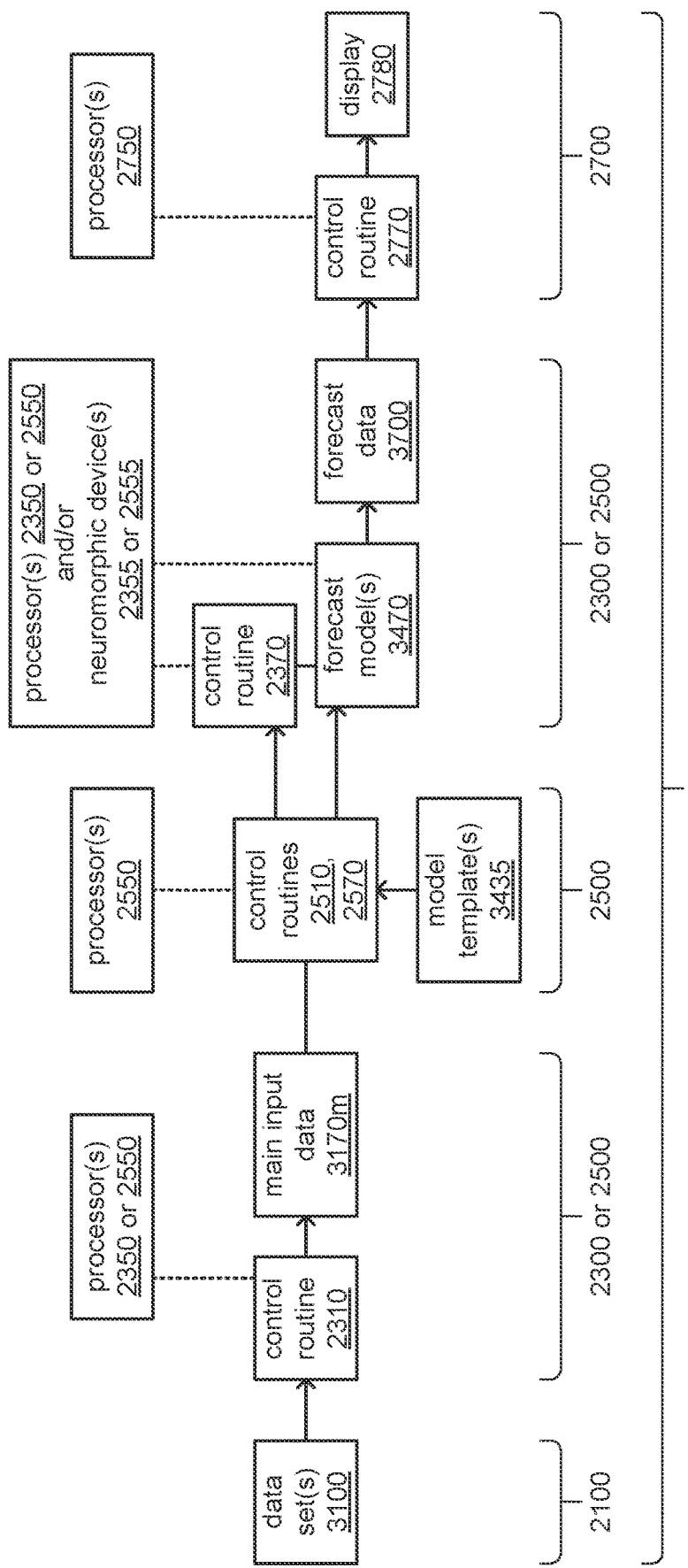
FIGS. 2A and 2B, together, illustrate an overview of an example of operating either of the example embodiments of a processing system of either of FIG. 1A or 1B.
Figure 2B:
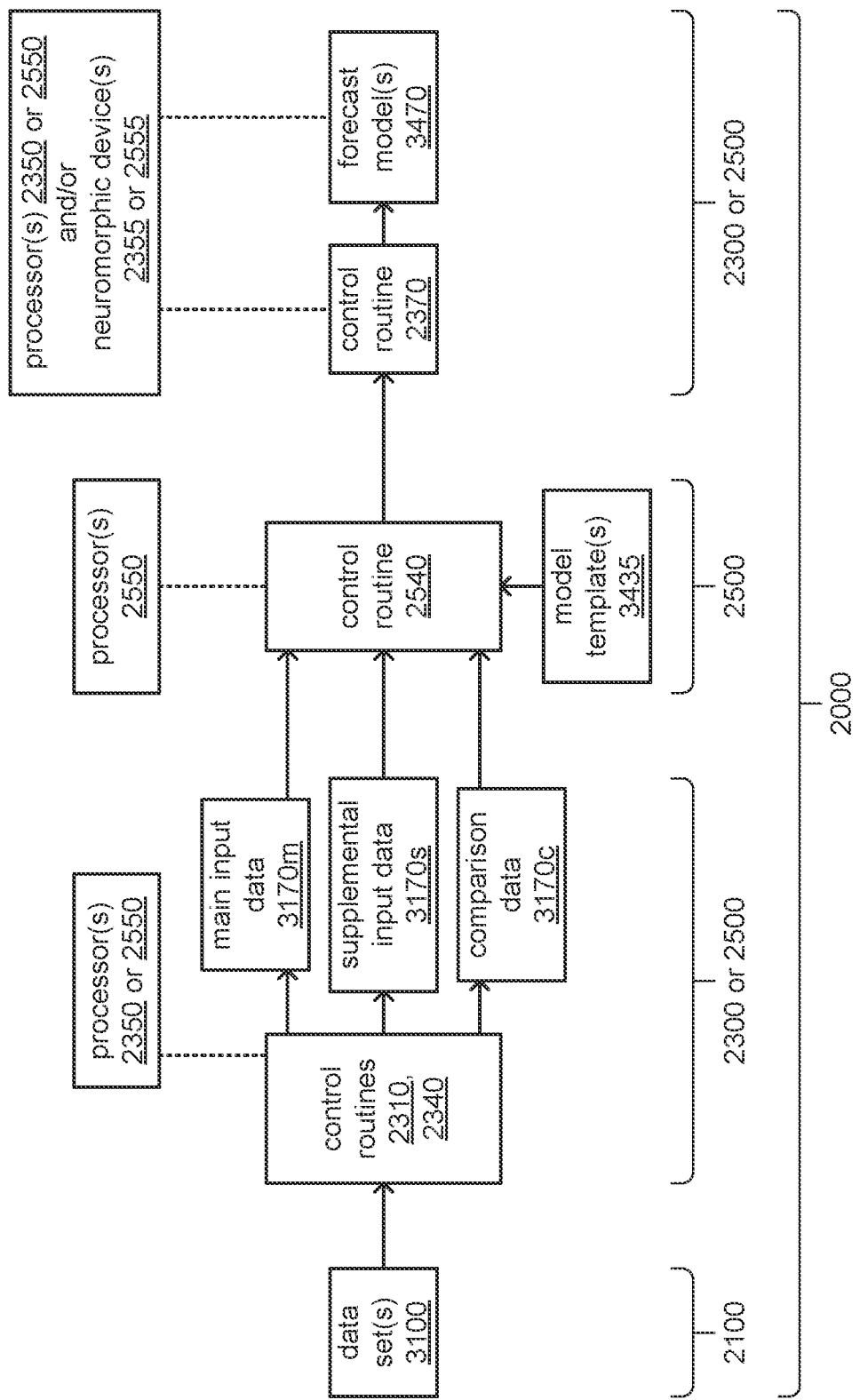

FIGS. 1A and 1B illustrate two different example embodiments of a processing system 2000, and FIGS. 2A and 2B, together, illustrate an example of the operation of either of these embodiments of the processing system 2000. More specifically, FIG. 1A illustrates a block diagram of an example embodiment of a distributed processing system 2000 incorporating one or more data sources 2100, one or more node devices 2300 that may form a node device grid 2003, at least one control device 2500 and/or at least one reviewing device 2700 coupled by a network 2999. FIG. 1B illustrates a block diagram of an alternate example embodiment of a non-distributed processing system 2000 in which the processing functionality of the one or more node devices 2300 is incorporated into the at least one control device 2500. FIG. 2A illustrates aspects of operating embodiments of the processing system 2000 of either FIG. 1A or 1B to generate forecasts. FIG. 2B illustrates aspects of operating embodiments of the processing system 2000 of either FIG. 1A or 1B to identify a trending topic, and to train new forecast model(s) to generate forecasts based on input data associated with the trending topic.

Turning to FIG. 1A, the data sources 2100 may each be any of a variety of devices (or may include a set of any of a variety of devices) that may generate and/or store one or more data sets 3100. One or more of the data sources 2100 may include one or more storage devices operated by a commercial, academic or governmental entity that may generate and/or provide data sets 3100 for online access (e.g., access via the Internet) as a service, such as an online library, online news data streaming service, online archives of official government data, online social media platform, etc. An example of such storage devices may be interconnected sets of computing devices across which large data sets may be stored in a distributed and/or redundant manner to better enable reliable and/or speedier access. It may be that such online access to data sets may be provided on a paid subscription basis by a commercial entity (e.g., a commercial data collection and exchange service, a commercial social media platform, a commercial news data service, etc.), or may be provided for free as a public service by a governmental or academic entity (e.g., National Oceanic and Atmospheric Administration, United States Geological Survey, National Weather Service, National Institutes of Health, Food and Drug Administration, research centers at colleges or universities such as John Hopkins University, etc.).

Alternatively or additionally, one or more of the data sources 2100 may be network-connected devices serving various functions within one or more larger systems of network-connected devices installed within houses or other structures, and/or installed across a geographical area. An example of such network-connected devices may be consumer appliances coupled to the Internet (such that they may be deemed to be "online") to form part of what is often referred to as an "Internet of things." Another example of such network-connected devices may be utility service equipment installed at the location of multiple houses and/or other structures as part of a utility system for the provision of electric power, water, natural gas, telecommunications, Internet access, etc., such as metering devices, devices at substations and/or types of distribution point, etc. Still another example of such network-connected devices may be geological and/or meteorological sensor devices positioned about a geographical area to gather seismic and/or weather data. It may be that such network-connected devices include varieties of controlling devices that gather data generated by other network-connected devices associated with particular houses and/or other structures, and aggregate that data into data sets 3100 for easier access.

Each of the data sets 3100 (including both of the depicted main data sets 3100$m$ and supplemental data sets 3100$s$) may include any of a wide variety of types of data associated with any of a wide variety of subjects, including data indicating changes in data values over various periods of time. By way of example, one or more of the data sets 3100 may include recorded observations concerning geological and/or meteorological events, or recorded observations from laboratory experiments in areas such as particle physics. By way of another example, one or more of the data sets 3100 may include indications of activities performed by a random sample of individuals of a population of people in a selected nationality or municipality, or of a population of a threatened species under study in the wild. By way of still another example, one or more data sets 3100 may include data collected from various sensors employed in the routine monitoring of various weather conditions or the routine monitoring of consumer appliances and/or machinery performing their functions, or from various sensors employed in monitoring aspects of environmental events and/or laboratory experiments.

As will be explained in greater detail, the data source(s) 2100, the node device(s) 2300, the control device 2500 and/or the reviewing device 2700 may cooperate through the network 2999 to generate forecasts based on one or more data sets 3100 stored by one or more sources 2100. In so doing, one or more of the data sets 3100 may be caused to be stored among the one or more node devices 2300 under the control of the control device 2500 as part of the performance of one or more data pre-processing operations. In various different embodiments, one or more whole data sets 3100 may be stored undivided within single one(s) of the node devices 2300. Alternatively or additionally, one or more data sets 3100 may be divided into portions that may be distributed through the network 2999 among multiple ones of the node devices 2300. Where a data set 3100 is stored by one of the data sources 2100 in a distributed manner across multiple devices of one of the data sources 2100, a transfer of that data set 3100 to multiple node devices 2300 may be conducted as multiple parallel exchanges through the network 2999 between differing pairs of devices.

In various embodiments, the network 2999 may be a single network that may extend within a single building or other relatively limited area, may be a combination of connected networks that may extend a considerable distance (e.g., include the Internet), and/or may include the Internet of Things as well as the use or employment of acoustic and non-acoustic measures (or combination). Thus, the network 2999 may be based on any of a variety (or combination) of non-acoustic communications technologies by which communications may be effected, including without limitation, wired technologies employing electrically and/or optically conductive cabling, and wireless technologies employing infrared, laser, radio frequency (RF) or other forms of wireless transmission and/or reception employing passive and/or active techniques. Alternatively or additionally, the communications technologies employed may include acoustic conductance through one or more gaseous, liquid and/or solid media, including and not limited to, acoustic signals propagated through air and/or other gases using tubing, hydrophones, arrays of passive and/or active acoustic transducers, and/or omnidirectional and/or directional acoustic receivers or transducers; acoustic signals propagated through all forms of media including: bodies of fresh or salt water using hydrophones; automobile assisted methods; diagnostics; non-destructive tests, sonography and ultrasonography, etc.

In various embodiments, each of the multiple node devices 2300 may incorporate one or more processors 2350, one or more neuromorphic devices 2355, a storage 2360, and/or a network interface 2390 to couple each of the node devices 2300 to the network 2999. The processor(s) 2350 may incorporate multiple processing cores 2351 and/or other features to support the execution of multiple executable routines and/or multiple instances of executable routine(s) across multiple execution threads. The neuromorphic device(s) 2355 may incorporate memristors and/or other machine learning components to implement various multi-layer neural networks and/or other forms of hardware-based machine learning. The storage 2360 may store control routines 2310, 2340 and/or 2370; one or more pieces of main input data 3170$m$; supplemental input data 3170$s$; and/or one or more pieces of comparison data 3170$c$. Each of the control routines 2310, 2340 and 2370 may incorporate a sequence of instructions operative on the processor(s) 2350 to implement logic to perform various functions.

In various embodiments, the control device 2500 may incorporate one or more processors 2550, one or more neuromorphic devices 2555, a storage 2560, and/or a network interface 2590 to couple the control device 2500 to the network 2999. The processor(s) 2550 may incorporate multiple processing cores 2551 and/or other features to support the execution of multiple executable routines and/or multiple instances of executable routine(s) across multiple execution threads. The neuromorphic device(s) 2555 may incorporate memristors and/or other machine learning components to implement various multi-layer neural networks and/or other forms of hardware-based machine learning. The storage 2560 may store control routines 2510, 2540 and/or 2570; configuration data 2535; forecast models 3470; model templates 3435; and/or forecast data 3700. Each of the control routines 2510, 2540 and 2570 may incorporate a sequence of instructions operative on the processor(s) 2550 to implement logic to perform various functions.

In various embodiments, the reviewing device 2700 may incorporate one or more processors 2750, a storage 2760, an input device 2720, a display 2780, and/or a network interface 2790 to couple the requesting device 2700 to the network 2999. The storage 2760 may store a control routine 2770 and/or forecast data 3700.

Turning to FIG. 2A, in addition to FIG. 1A, one or more data source(s) 2100, one or more node device(s) 2300, the control device 2500 and/or the reviewing device 2700 may cooperate through the network 2999 to generate a forecast that may be visually presented by the reviewing device 2700.

In executing the control routine 2510, the processor(s) 2550 of the control device 2500 may coordinate various pre-processing operations performed by the node device(s) 2300 in cooperation with the data source(s) 2100 to use a set of main keywords associated with a set of main topics to search for and retrieve one or more main data sets 3100$m$, and to then extract portions of main input data 3170$m$ from those main data set(s) 3100$m$. As will be explained in greater detail, such cooperation between the node device(s) 2300 and the data source(s) 2100 may entail the use of API(s) 2195 provided by the data source(s) 2100.

In executing the control routine 2310, the processor(s) 2350 of each of the node devices 2300 may be caused to perform various pre-processing operations to extract main input data 3170$m$ from main data set(s) 3100$m$ under the control of the control device 2500. Again, it may be that portions of data sets 3100 and/or whole data sets 3100 may be provided by data source(s) 2100 and distributed among multiple ones of the node devices 2300, and this may enable the performance of such pre-processing operations on multiple data sets 3100 in a distributed manner. It is envisioned that the data set(s) 3100, such as the main data sets 3100$m$, may include text of any of a variety of types that may include various pieces of data that are desired to be extracted. Thus, such pre-processing operations may include various forms of NLP to identify topics and/or sentiments that provide an indication of what pieces of data may be present, and/or to separate the main input data 3170$m$ from such text. Alternatively or additionally, it is envisioned that the data set(s) 3100, such as the main data sets 3100$m$, may include various data structures into which numerous data values may be organized (e.g., tables, lists, multi-dimensional arrays with indexing schemes, etc.). Thus, such pre-processing operations may include the identification of types of data structure and/or indexing scheme to enable retrieval of the main input data 3170$m$ from such data structures. Indeed, it is envisioned that combinations of text and data structures may also be present within the data set(s) 3100, such as for example, a two-dimensional array of text documents. Regardless of the exact data types and/or arrangement of data values within each data set 3100, the now extracted main input data 3170$m$ may then be provided to the control device 2500 to be used as input to subsequent processing operations to generate the forecast therefrom.

In executing the control routine 2570, the processor(s) 2550 of the control device 2500 may coordinate various processing operations performed by the node device(s) 2300 to use multiple forecast models 3470 in a distributed manner as part of generating the forecast. As will be explained in greater detail, multiple ones of the forecast models 3470 may be used together to implement any of a variety of types of hybrid combination to generate the forecast.

In executing the control routine 2370, the processor(s) 2350 and/or neuromorphic device(s) 2355 of each of the node devices 2300 may be caused to perform various processing operations to use differing ones of the forecast models 3470 to generate components of the forecast. As will be explained in greater detail, each of the forecast models 3470 may be implemented as executable code written in a programming and/or scripting language, as a set of hyperparameters descriptive of a neural network, and/or as a markup language. Thus, different one(s) of the forecast models 3470 may be provided to each of the node devices 2300 to enable the use of multiple different ones of the forecast models 3470 in a distributed manner. Each of the now generated components of the forecast may then be provided to the control device 2500.

In further executing the control routine 2570, the processor(s) 2550 of the control device 2500 may use any of a variety of types of aggregation of the forecast components received from the node devices 2300 to generate an indication of the forecast stored as the forecast data 3700. As will be explained in further detail, the forecast data 3700 may also include indications of various aspects of the generation of the forecast and/or various pieces of information indicative of a degree of accuracy of the forecast and/or of a previous forecast. The forecast data 3700 may then be provided to the reviewing device 2700 where at least the forecast may be visually presented on the display 2780.

Turning to FIG. 2B, in addition to FIG. 1A, one or more data source(s) 2100, one or more node device(s) 2300 and/or the control device 2500 may cooperate through the network 2999 to identify a trending topic to be added to an existing set of main topics used as a basis for generating forecasts, and to train new forecast models to use a new set of main topics that includes the trending topic as a basis for generating forecasts.

In executing the control routine 2540, the processor(s) 2550 of the control device 2500 may coordinate various pre-processing and processing operations performed by the node device(s) 2300 in cooperation with the data source(s) 2100 to identify a new topic based on various criteria, and then to train new forecast models 3470 to also use input data associated with the new topic as input to generating forecasts. Again, as will be explained in greater detail, such cooperation between the node device(s) 2300 and the data source(s) 2100 may entail the use of API(s) 2195 provided by the data source(s) 2100.

In executing the control routine 2310, the processor(s) 2350 of each of the node devices 2300 may be caused to perform various pre-processing operations to extract main input data 3170$m$ from main data set(s) 3100$m$, supplemental input data 3170$s$ from supplemental data set(s) 3100$s$, and/or comparison data 3170$c$ from main data set(s) 3100$m$ and/or supplemental data set(s) 3100$s$ under the control of the control device 2500. Again, it may be that the main data set(s) 3100$m$ are those from which the main input data 3170$m$ are extracted, while the supplemental data set(s) 3100$s$ are not. However, it may also be that, in an effort to increase the likelihood of spotting a trending topic that may influence forecasts, queries made to so identify such a trending topic are caused to include both the main data set(s) 3100$m$ and the supplemental data set(s) 3100$s$.

More specifically, in also executing the control routine 2340, the processor(s) 2350 of each of the node devices 2300 may also be caused to analyze each of the main data set(s) 3100$m$ and each of the supplemental data sets 3100$s$ to identify topics within each, and the relative prominence of those topics within each. Where a topic is identified that is not already among the set of main topics, and is found to have either a prominence among the analyzed data sets 3100$m$ and 3100$s$ that meets a minimum threshold of prominence, or a rate of growth in its prominence that meets a minimum threshold rate of growth in prominence, then such a topic might be deemed to be a candidate trending topic to be considered for addition to the set of main topics.

In continuing to execute the control routine 2540, with the identification of such a candidate topic, the processor(s) 2550 of the control device 2500 may use the API(s) 2195 to provide a query to the data source(s) 2100 concerning the frequency with which the candidate topic appears in online searches that may be directed to the data source(s) 2100. The answer received in response to such a query may then be analyzed to determine if the frequency with which the candidate topic is included in online searches meets either a minimum threshold of frequency, or a minimum threshold rate of growth in the frequency with which the candidate topic is in online searches. If so, then the candidate topic may then be deemed to be a trending topic. With the candidate topic having now been identified as a new trending topic, the processor(s) 2550 may again use the API(s) 2195 to provide a query to the data source(s) 2100 concerning what keywords are being used in such online searches concerning the trending topic. The answer received in response to such a query may then analyzed to identify the most frequently used keyword(s) in searches concerning the trending topic.

In continuing to execute the control routine 2540, the processor(s) 2550 of the control device 2500 may then cooperate with the node devices 2300 to use those most frequently used keyword(s) to search for supplemental data sets 3100$s$ that include the trending topic in a manner similar to how the set of main keywords associated with the set of main topics are used to search for the main data sets 3100$m$ that include one or more main topics of the set of main topics. Supplemental input data 3170$s$ may then be extracted and received from the node devices 2300 in a similar manner to the earlier described searching and extraction of the main input data 3170$m$. The control device 2500 may also receive, from the node devices 2300, comparison data 3170$c$ indicative of observed values for the subject about which forecasts are made. The processor(s) 2550 may then analyze the supplemental input data 3170$s$ along with the comparison data 3170$c$ to determine whether there is a causal relationship therebetween to a degree that is sufficient for the trending topic to be deemed as having sufficient influence on the subject of the forecasts as to warrant adding the trending topic to the set of main topics. More specifically, it may be deemed to be advantageous to add the trending topic to the set of main topics if it is determined that the trending topic is able to cause a great enough decrease in forecasting accuracy while the trending topic is not included in the set of main topics, and/or is able to cause a great enough increase in forecasting accuracy with the trending topic included in the set of main topics.

In continuing to execute the control routine 2340, the processor(s) 2350 of the node devices may be caused to train new forecast models 3470 to accommodate the addition of the trending topic to the set of main topics. In a manner similar to the aforedescribed distributed use of differing forecast models 3470 among multiple ones of the node devices 2300 in generating a forecast, it may be that the training of new forecast models 3470 is also distributed among multiple node devices 2300 such that differing ones of the new forecast models 3470 are trained within each node device using the same training data. In this way, ensemble training of multiple new forecast models 3470 may be performed in a distributed manner. Similarly, following such distributed training of new forecast models 3470, the new forecast models 3470 may then be tested in a distributed manner across the same multiple node devices 2300 using the same testing data. The resulting set of new forecast models 3470 and indications of their degrees of accuracy determined from the testing may then be provided to the control device 2500.

In continuing to execute the control routine 2540, the processor(s) 2500 of the control device may be caused to select one or more champion forecast models 3470 that achieved higher degrees of forecast accuracy for use in making forecasts.

Comparing FIGS. 1A and 1B, as an alternative to the distributed processing system 2000 of FIG. 1A that includes multiple node device(s) 2300 among which at least a subset of operations may be performed at least partially in parallel in a distributed manner, as described above, it may instead be the case that such at least partially parallel performances are to be distributed across multiple processor cores 2551 of the processor(s) 2550 of the control device 2500 of the processing system 2000 of FIG. 1B. As also depicted in FIG. 1B, it may be that the control device 2500 receives the data sets 3100 in lieu of their being separate and distinct node devices 2300 to do so. More specifically, and by way of example, it may be that virtual equivalents to the node devices 2300 may be implemented as virtual machines (VMs) and/or within multiple container environments within the control device 2500 in the processing system 2000 of FIG. 1B to perform some or all of the aforedescribed functions thereof.

Figure 3A:
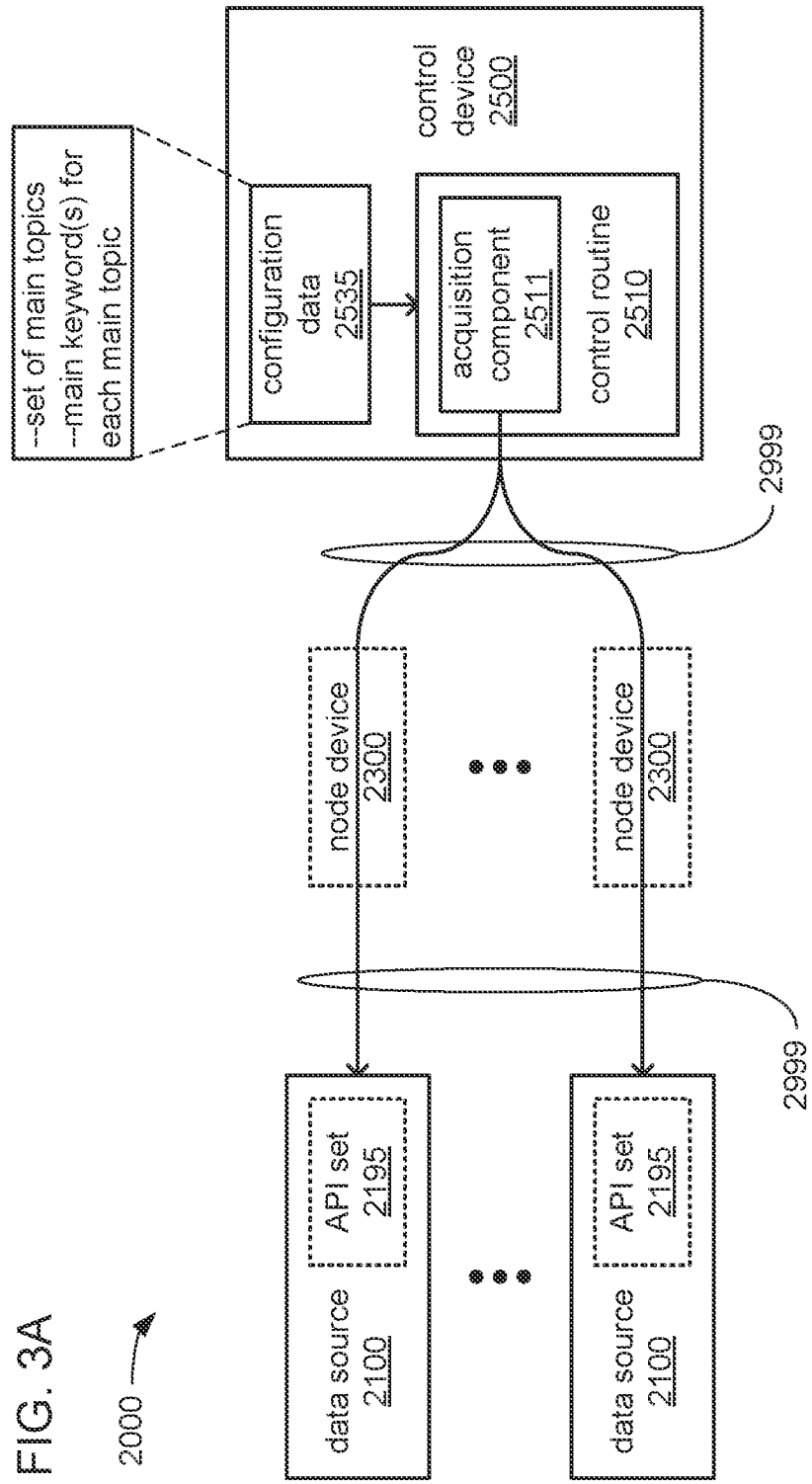
Figure 3C:
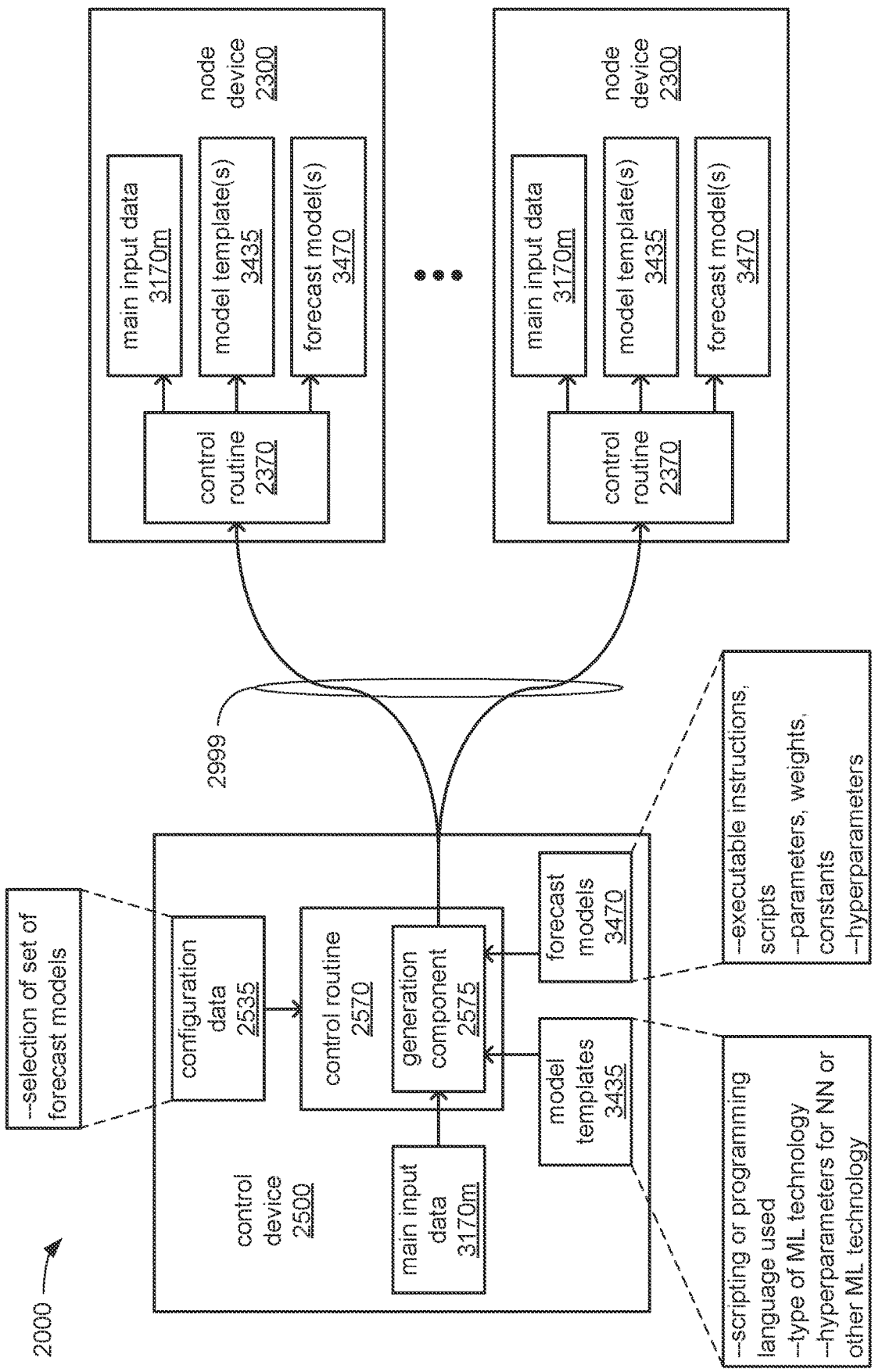
Figure 3D:
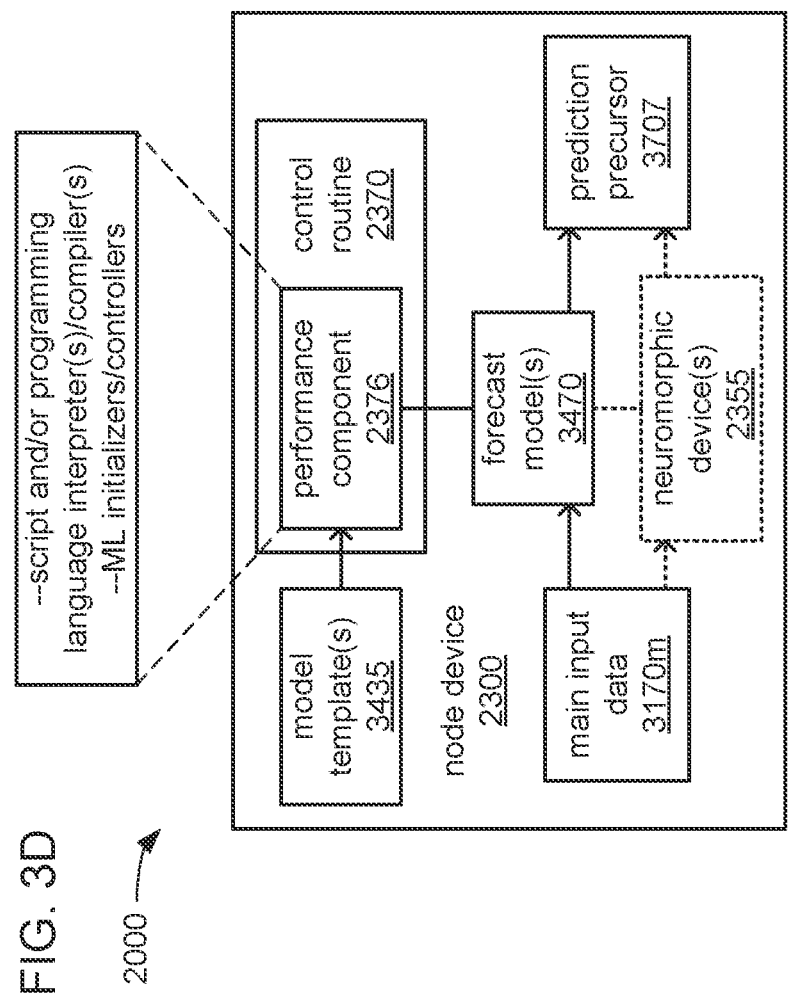
Figure 3E:
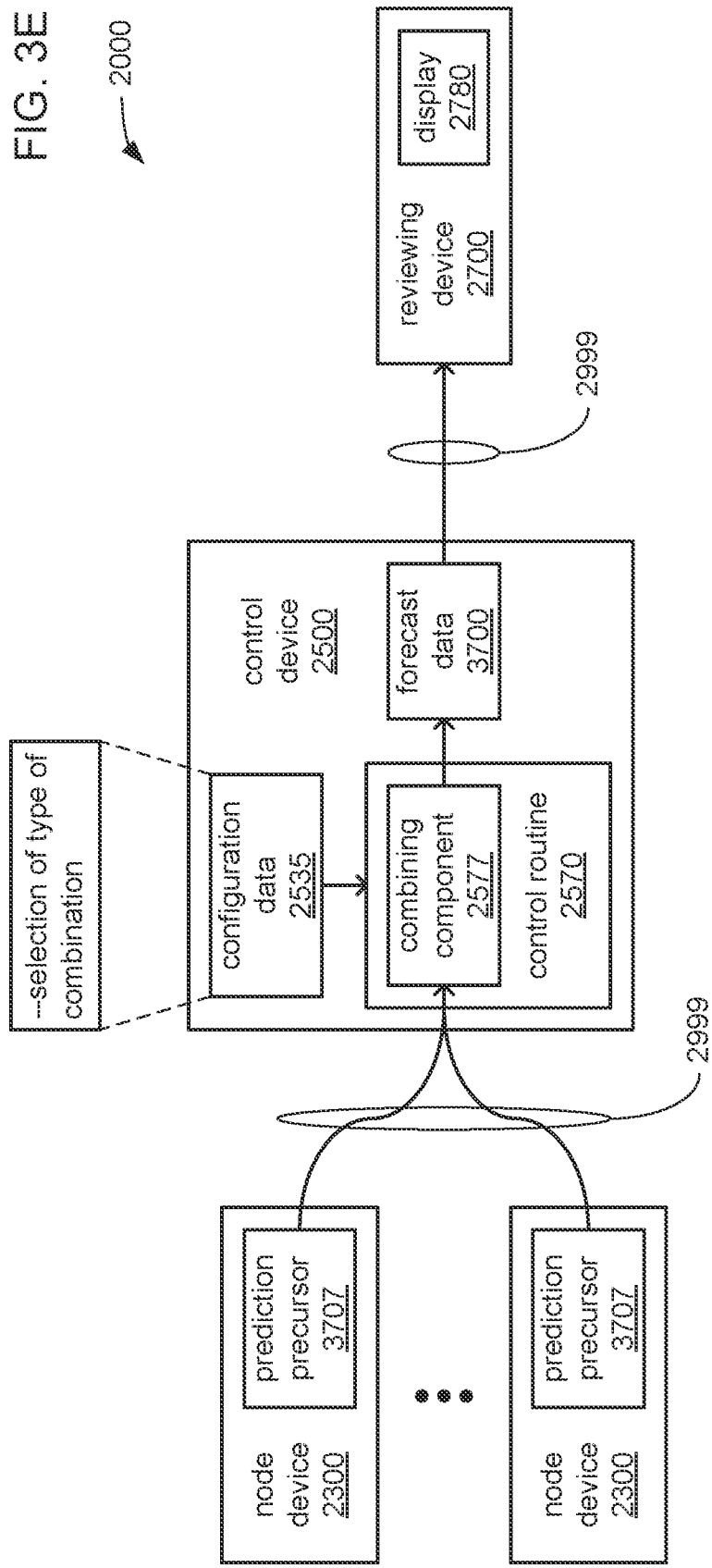

FIGS. 3A, 3B, 3C, 3D and 3E, taken together, illustrate, in greater detail, aspects of the operation of an embodiment of the distributed processing system 2000 of FIG. 1A to generate a forecast. FIGS. 3A-B illustrate aspects of acquiring main data sets 3100m from data sources 2100 through the use of main key words associated with an existing pre-selected set of main topics. FIG. 3B also illustrates aspects of performing various pre-processing operations in a distributed manner on acquired main data sets 3100m to generate main input data 3170m for use as input to generating a forecast. FIGS. 3C-E illustrate aspects of generating the forecast using a hybrid combination of multiple existing forecast models 3470 in a distributed manner. FIG. 3E also illustrates aspects of combining the outputs of the multiple forecast models 3470 at the final stage of generating the forecast.

It should be noted that FIGS. 3A-E discuss operations performed within an embodiment of the distributed processing system of FIG. 1A. However, such operations may alternately be performed within an embodiment of the processing system of FIG. 1B, with various ones of the different processing operations that are able to be performed at least partially in parallel being performed in a distributed manner among multiple processing cores 2551 and/or among multiple ones of the processor 2550 of the control device 2500.

Turning to FIG. 3A, within the control device of an embodiment of the distributed processing system 2000 of FIG. 1A, a processing core 2551 may be caused by the execution of an acquisition component 2511 of the control routine 2510 to generate and transmit queries through the network 2999 to each of one or more of the data sources 2100 to retrieve one or more main data sets 3100m. Alternatively, and as depicted with dotted lines, instead of such operations being performed directly between the control device 2500 and the data source(s) 2100, it may be that such queries are relayed through one or more node devices 2300. Also alternatively, it may be that such queries are generated within and transmitted from one or more node devices 2300, and this may be under the control of the processing core 2551 executing the acquisition component 2511.

Regardless of the exact manner in which such queries are generated and transmitted, it may be that the configuration data 2535 stores indications of the set of main topics that serve as the basis for the generation of inputs. Accordingly, and as depicted, the configuration data 2535 may also store indications of one or more keywords that may be used in such queries for each of the main topics of the set of main topics. As also depicted, each of the data sources 2100 may support the use of an API set 2195 as a form of language and/or protocol by which queries may be provided to the data sources 2100. Thus, the keyword(s) for each the main topics may be incorporated into a query that is generated to fit the syntax and/or other specifications of the particular API set 2195 of the data source 2100 to which it is transmitted.

Turning to FIG. 3B, along with FIG. 3A, in response to such queries, each of the node devices 2300 may be provided, through the network 2999, with at least portion(s) of one or more main data sets 3100m. The queries transmitted to the data source(s) 2100 may each specify which one(s) of the node devices 2300 are to be provided with one or more main data sets 3100m in response.

Within each of such node devices 2300, one or more processor cores 2531 of one or more processors 2530 may be caused by the execution of an extraction component 2312 of the control routine 2310 to perform various pre-processing operations to extract main input data portions 3171m of the main input data 3170m that is to be used in generating the forecast. As depicted, such extraction may be done in a distributed manner across multiple main data sets 3100m, at least partially in parallel, and/or across multiple node devices 2300. Each of the main input data portions 3171m may be provided via the network 2999 to the control device 2500 to be used in generating the main input data 3170m.

As previously discussed, each of the main data sets 3100m may include any of wide variety of types of data concerning any of a wide variety of subjects. Thus, each main data set 3100m may include one or more of audio data (e.g., speech), video data, image data, numeric data, bitwise data, textual data, etc., and such data may be organized within each main data set 3100m, in any of wide variety of ways, using any of a wide variety of types of data structure, and/or employing any of a wide variety of types of delimiter and/or indexing scheme.

Accordingly, any of a wide variety of pre-processing operations may need to be performed to extract data values from any of a wide variety data structures. Thus, various forms of data cleaning, reformatting, conversion, normalization, quality improvement, etc., operations may need to be performed to enable the extraction of pieces of data and/or to put such extracted pieces into proper form to become part of the main input data 3170m. Alternatively or additionally, any of a variety of pre-processing operations may need to be performed to identify the pieces of data that are to become part of the main input data 3170m. Thus, various forms of recognition operation may need to be performed, such as various forms of NLP to perform extraction from textual data (and/or from speech data) to identify topics, sentiments, etc., such as lemmatization, tokenization, latent Dirichlet allocation (LDA), etc. By way of example, where one or more of the main data sets 3100m include text, LDA may be performed to identify topics present therein. In so doing, weight values indicative of the relative prominence of various topics within each main data set 3100m may be generated as part of each main input data portion 3171m. Within the control device 2500, execution of an aggregation component 2513 of the control routine 2510 may cause processing core(s) 2551 of processor(s) 2550 of the control device 2500 to combine such weight values (e.g., within a table, or other data structure covering all of the main data sets 3100m) as part of identifying best sources of data for each main topic of the set of main topics across all of the main data sets 3100m.

However, it should be noted that other embodiments are possible in which there may be at least the ability to perform at least a subset of such pre-processing operations at one or more of the data sources 2100 prior to the provision of any main data set 3100m to a node device 2300 and/or to the control device 2500. More specifically, it may be that the API set 2195 supports making requests for at least some degree of pre-processing to be performed on main data sets 3100*m* at the data source(s) 2100 as part of identifying ones of the main data sets 3100*m* that are more likely to have the data that is sought to be included in the main input data 3170*m* for use in making forecasts. Thus, main data sets 3100*m* may be provided from the data sources 2100 to the node devices 2300 with corresponding indications of which ones are more likely to include data concerning specific main topics of the set of main topics.

Turning to FIG. 3C, regardless of the exact manner in which the main data sets 3100*m* are acquired, and regardless of the exact manner in which the data included in the main input data 3170*m* is extracted from the main data sets 3100*m*, execution of a generation component 2575 of the control routine 2570 may cause processing core(s) 2551 of processor(s) 2550 of the control device 2500 to coordinate the use of multiple forecast models 3470 in generating the forecast. More specifically, different ones of the forecast models 3470 may be distributed to different ones of the node devices 2300 through the network 2999, along with corresponding ones of the model templates 3435 and a copy of the main input data 3170*m*. As depicted, the configuration data 2535 may include an indication of which ones of the forecast models 3470 have been selected to be used. As will be explained in greater detail, the selection of forecast models 3470 that are to be used in making forecasts may be based on determinations of relative degrees of accuracy as a result of testing.

Each of the forecast models 3470 may be based on any of a variety of ML technologies, including and not limited to, neural networks of various types (e.g., convolutional neural network, feedforward neural network, recurrent neural network, etc.), variational autoencoders, generative adversarial networks, learning automata based on stochastic matrices, evolutionary algorithms based on randomly generated code pieces, etc., including one or more forecast models from among those use with various products of SAS Institute of Cary, N.C., USA, including and not limited to, SAS Visual Forecasting, SAS Demand Planning and SAS Visual Data Mining and Machine Learning. More specifically, each forecast model 3470 may include executable instructions (e.g., programming code or script), one or more hyperparameters specifying any of a variety of configuration details for the selected type of ML technology (e.g., weights, biases, triggering function, etc.), one or more constants, etc.

As will be familiar to those skilled in the art, implementing many varieties of ML technology may include writing executable instructions in any of a variety of available programming or scripting languages, and/or may include relying on the provision of any of a variety of available libraries of executable instructions implementing various ML routines. To better enable the use of a wider variety of forecast models 3470 employing a wider variety of technologies, each model template 3435 may include indications of various details of its corresponding forecast model 3470, including and not limited to, what type of ML technology and/or what generation thereof is used, what programming or scripting language is used, what library or libraries are relied upon (and/or what version(s) thereof) one or more hyperparameters (e.g., type of NN, minimum quantity of memristors and/or layers, etc.), what file format or other characteristics of storage (e.g., storage locations for various pieces of data), etc. Alternatively or additionally, one or more of the model templates 3435 may include additional executable instructions written in a programming or scripting language to cause the performance of various initialization or other supporting operations to better support the use of a corresponding forecast model 3470. Supporting the use of multiple forecast models 3470 written using differing programming and/or scripting languages may require the availability of multiple differing interpreters and/or compilers, and such indications as choice of programming or scripting language in the model templates 3435 may enable the automated selection and use of appropriate interpreters/compilers and/or appropriate versions thereof.

In some embodiments, it may be that the set of forecast models 3470 available for use may be provided by multiple different sources. By way of example, it may be that the system 2000 is operated by a commercial, academic or governmental entity with the ability to generate at least a subset of the forecast models 3470 in house, while others may be provided to that entity from external sources under various licensing arrangements. In at least some of such embodiments, it may be that each of the model templates 3435 also includes an indication of the origin of its corresponding one of the forecast models 3470, and/or of the type of license associated therewith that may impose one or more limitations on the manner in which it may be used.

Turning to FIG. 3D, within each node device 2300, and with the combination of the main input data 3170*m*, a forecast model 3470 and corresponding model template 3435 provided thereto, it may be that execution of a performance component 2376 of the control routine 2370 may cause processing core(s) 2351 of processor(s) 2350 of the node device 2300 to use the forecast model 3470. More specifically, within each node device 2300, the use of a forecast model 3470 provided by the control device 2500 may cause the generation of a forecast precursor 3707 that includes an indication of the forecast made using that particular forecast model 3470, and that is provided to the control device 2500 via the network to be combined with forecast precursors 3707 received from others of the node devices 2300 to then generate the forecast.

As depicted, the performance component 2376 may incorporate multiple programming and/or script language interpreters and/or compilers as part of supporting the forecast model 3470 including executable instructions written in any of a variety of such languages. Indeed, use of the forecast model 3470 may begin with the processing core(s) 2351 being caused to analyze the contents of the model template 3435 that corresponds to the forecast model 3470 to retrieve the indications of various aspects of the forecast model 3470 that are stored therein, as previously discussed. With such information from the model template 3435 having been used to make various preparations for the use of the forecast model 3470, the processing core(s) 2351 may then proceed with using it.

Where the forecast model 3470 includes executable instructions, the needed libraries (if any) may be retrieved, and the needed interpreter(s) and/or compiler(s) may be employed in executing those instructions to cause the instantiation and/or use of the forecast model 3470 to generate the forecast precursor 3707 from the main input data 3170*m*. Where the forecast model 3470 employs a form of ML that is amenable to being implemented by the one or more neuromorphic devices 2355 of the node device 2350 such that the forecast model 3470 may be able to be used more efficiently, the various parameters and/or hyperparameters needed to configure the neuromorphic devices 2355 may be retrieved and used to do so, and then the forecast model 3470, as implemented using the neuromorphic device(s) 2355, may then be used to generate the forecast precursor 3707 from the main input data 3170*m*.

As will be familiar to those skilled in the art, at least some varieties of neural networks are able to be implemented using one or more neuromorphic devices that incorporate multiple memristors able to implement artificial neurons, and that are able to have their inputs and outputs coupled in any of a variety of interconnection configurations that define inputs and outputs of the neural network, layers of the neural network, and the flow of signals between artificial neurons within layers and/or between layers. In support of such use of the neuromorphic device(s) 2355, the performance component 2376 may incorporate various initialization and/or control routines for preparing the neuromorphic device(s) 2355 for use, and/or in otherwise supporting the use of the neuromorphic device(s) 2355 to implement various forms of ML.

Turning to FIG. 3E, in further executing the control routine 2570, processing core(s) 2551 of processor(s) 2550 of the control device 2500 may be caused by the combining routine 2577 thereof to combine the forecasts of the individual forecast models 3470 indicated in the forecast precursors 3707 in any of a variety of ways (e.g., in any of a variety of hybrid combinations) to generate the single forecast from the main input data 3170$m$. This single forecast may then be stored as the forecast data 3700 for transmission to another device via the network for any of a variety of uses, such as to the reviewing device 2700 for being visually presented on the display 2780 thereof. As depicted, the configuration data 2535 may include an indication of the type of combination (e.g., average, weighted average, selection of a subset of the incoming forecasts based on specified factors, etc.) that is to be used in this last stage to generate the forecast. As previously mentioned, and as will shortly be described in greater detail, it may be that the selection of forecast models 3470 that are used at least partially in parallel in a distributed manner may be selected based on their relative degrees of accuracy based on testing. In such embodiments, it may be that a simple average is used in generating the forecast therefrom.

In various embodiments, the forecast that is so generated and provided to the reviewing device 2700 may be subjected to any of a variety of types of data enrichment within the reviewing device 2700. By way of example, the forecast may be analyzed and/or adjusted in light of new information beyond what may be taken into account by a newly adopted trending topic, as will shortly be explained. Alternatively or additionally, the forecast may be adjusted and/or weighted in any of a variety of ways that reflect past findings of the accuracy of previous forecasts generated by the same hybrid combination of forecast models 3470.

Figure 4B:
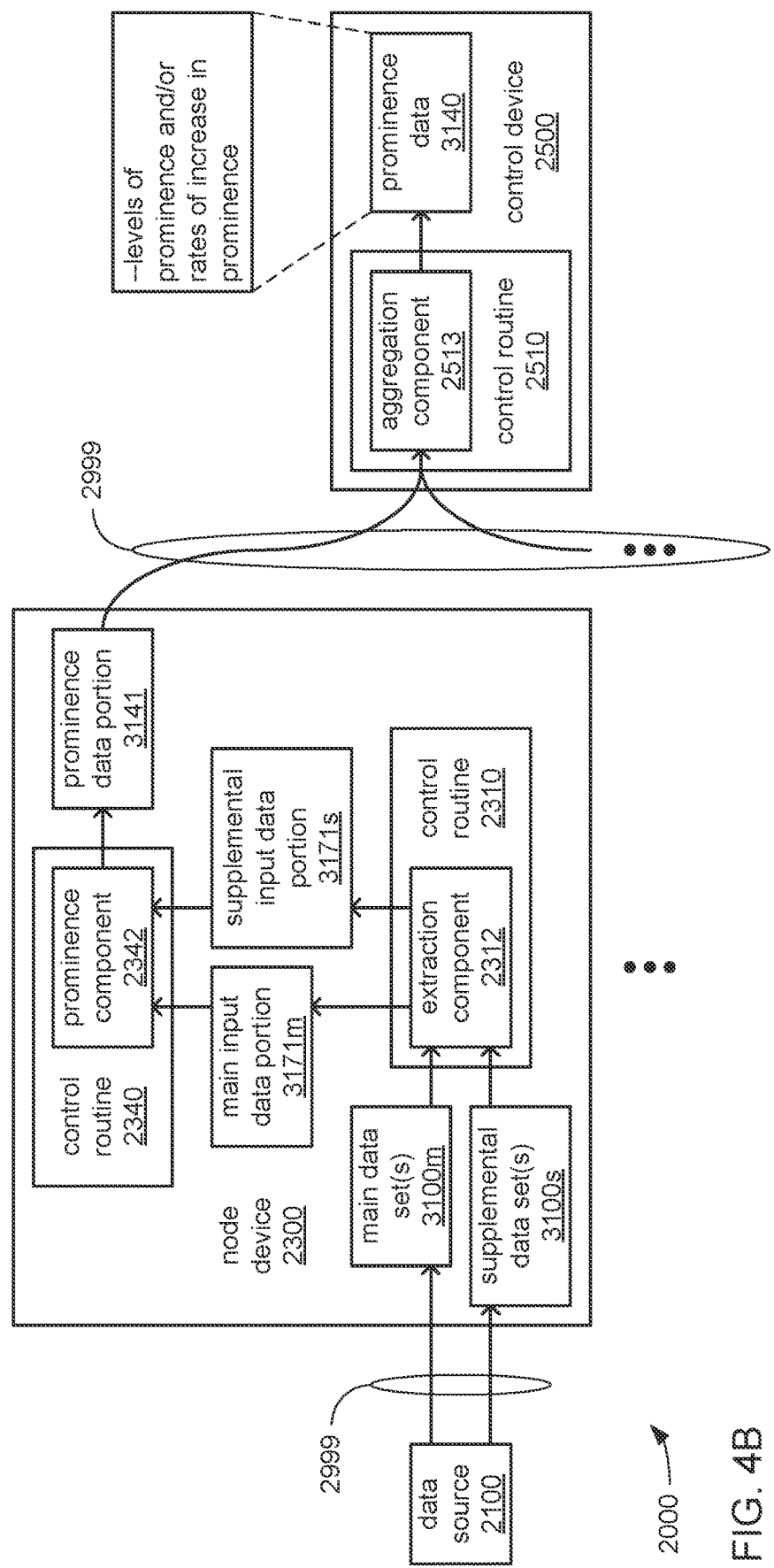
Figure 4C:
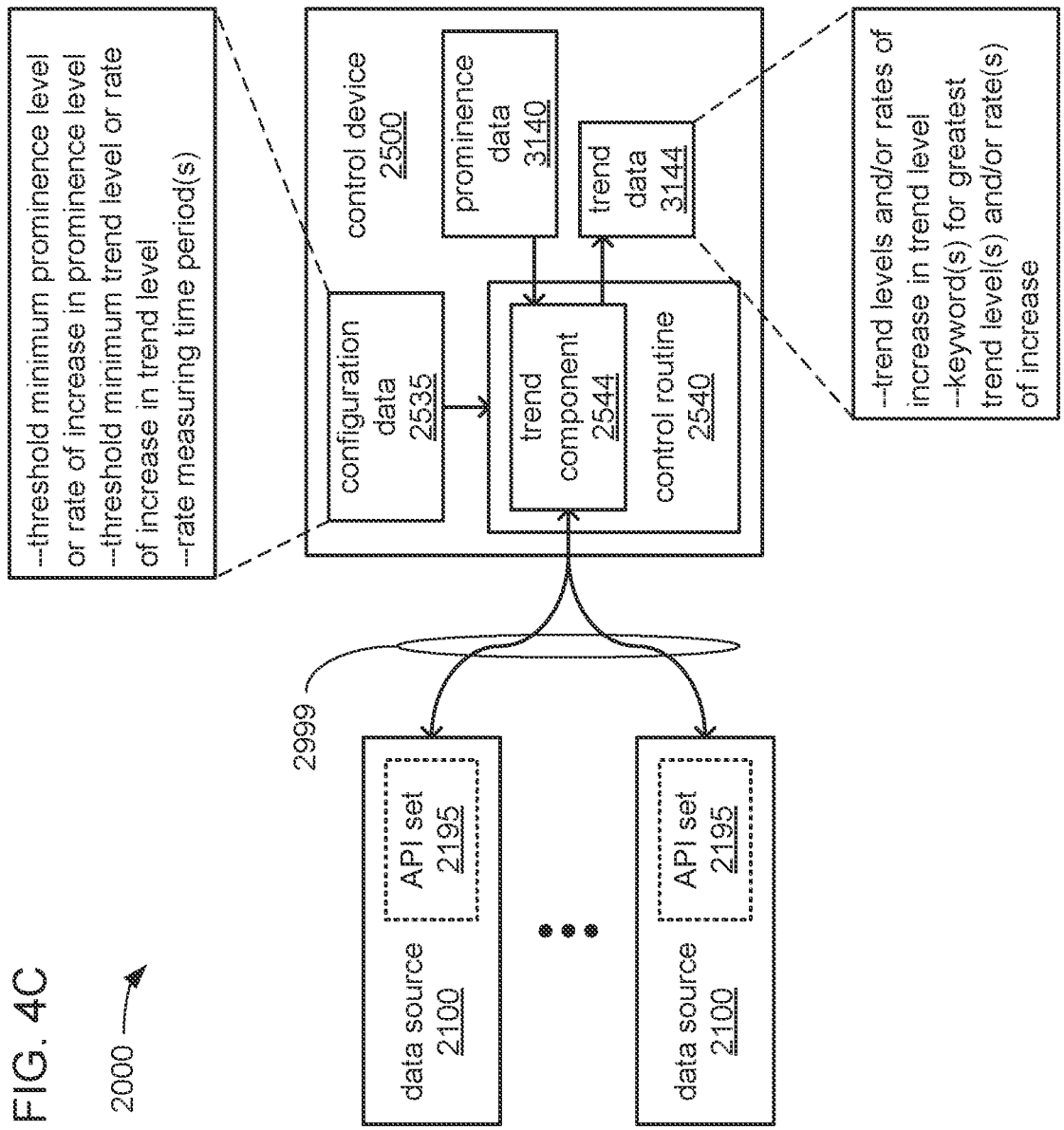
Figure 4D:
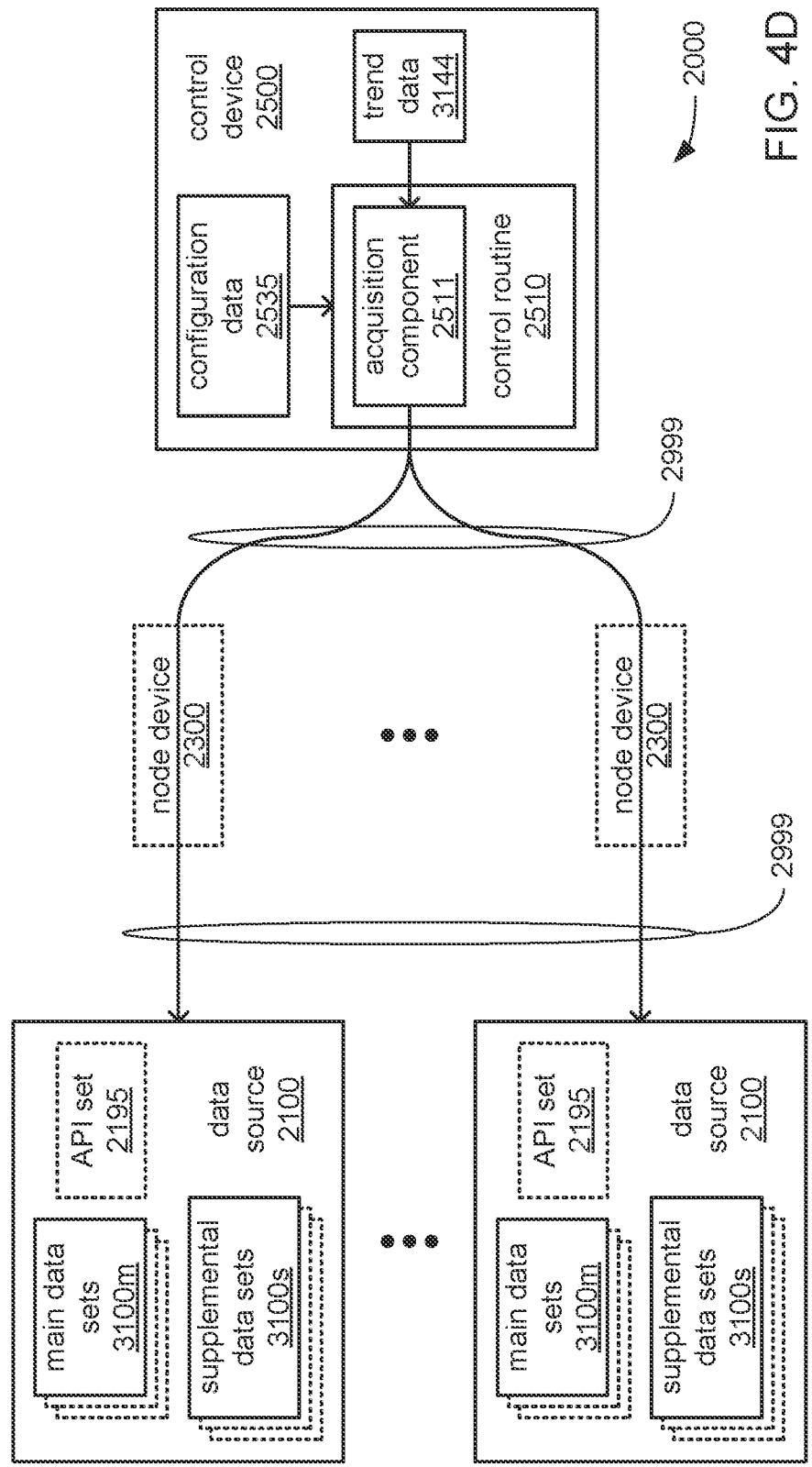
Figure 4F:
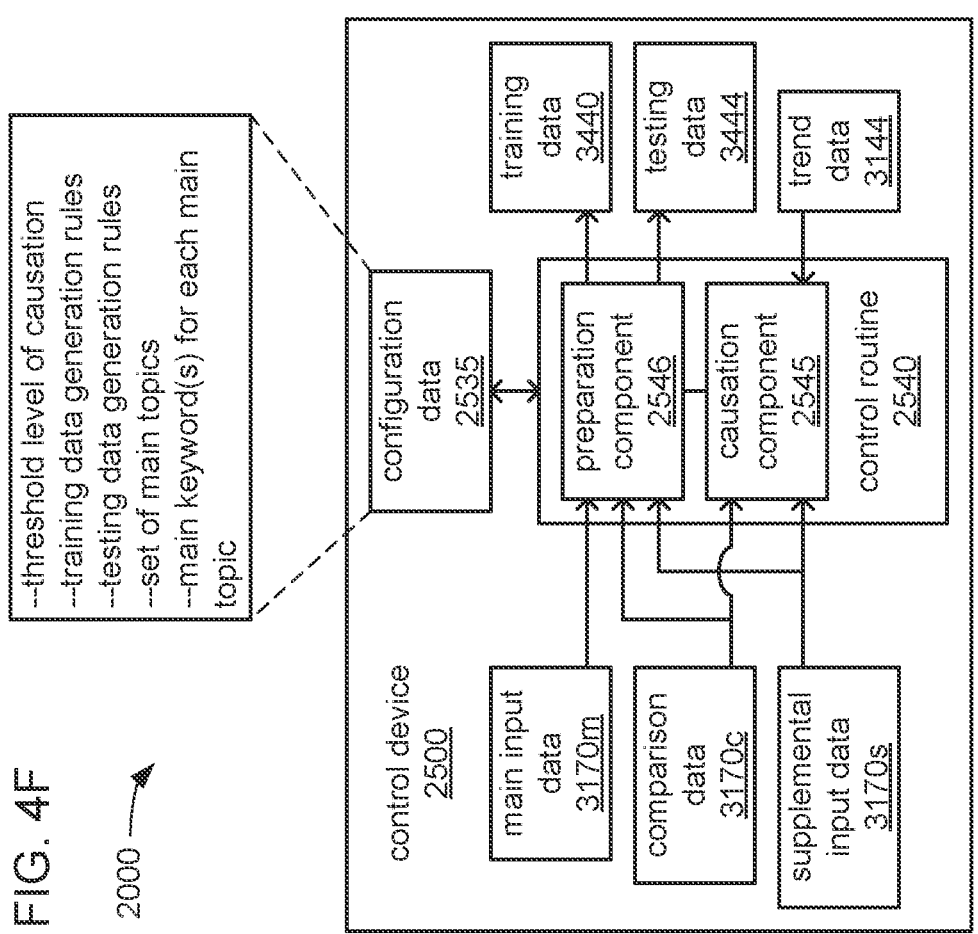
Figure 4G:
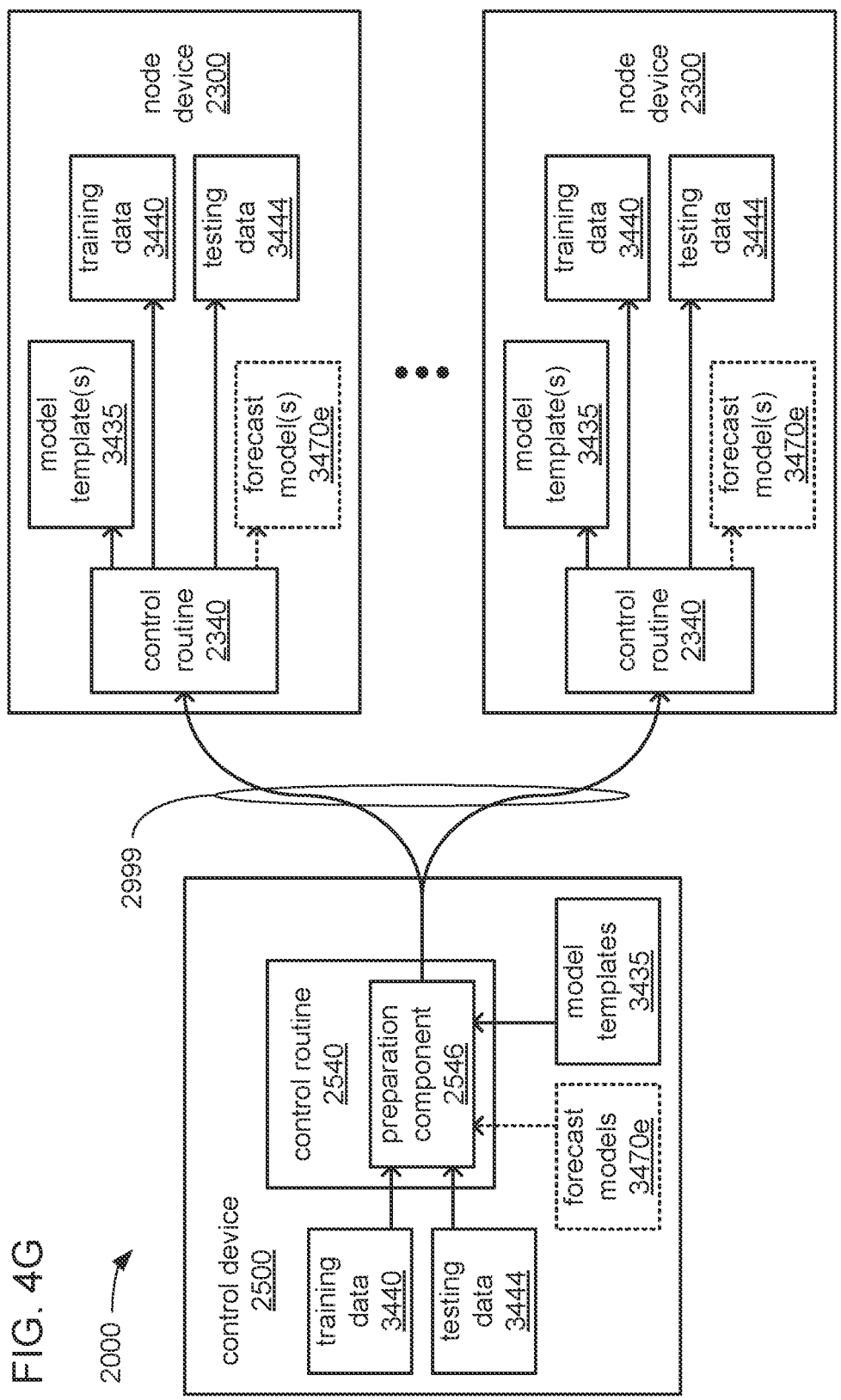
Figure 4I:
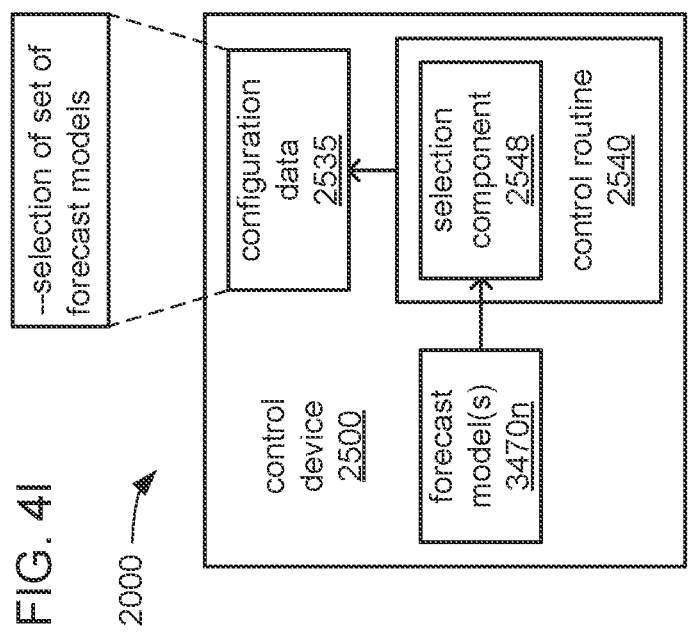

FIGS. 4A, 4B, 4C, 4D, 4E, 4F, 4G, 4H and 4I, taken together, illustrate, in greater detail, aspects of the operation of an embodiment of the distributed processing system 2000 of FIG. 1A to train multiple forecast models to generate forecasts additionally based on a significant trending topic in response to identifying the significant trending topic. FIGS. 4A-B illustrate aspects of acquiring main data sets 3100$m$ and/or supplemental data sets 3100$s$ from data sources 2100. FIG. 4B also illustrates aspects of performing various pre-processing operations to extract data and to identify prominent topics in a distributed manner on data sets 3100$m$ and/or 3100$s$. FIG. 4C illustrates aspect of identifying and obtaining keyword(s) for new topic(s) that are both prominent and trending. FIGS. 4D-E illustrate aspects of acquiring further main data sets 3100$m$ and/or supplemental data sets 3100$s$ from data sources 2100 using the keyword(s) for the new topic(s). FIG. 4E also illustrates aspects of performing various pre-processing operations to extract data associated with the new trending topic(s), and associated with the subject about which forecasts are made. FIG. 4F illustrates aspects of an analysis of the data associated with the new trending topic, and associated with the subject about which forecasts are made to determine whether there is a sufficient causal association as to trigger the addition of the new trending topic(s) to the set of main topics already relied upon in generating forecasts. FIGS. 4G-H illustrate aspects of training new forecast models 3470$n$ to also be based on the new trending topic, thereby replacing existing forecast models 3470$e$. FIG. 4I illustrates aspects of selecting a subset of the new forecasts models 3470$n$ that may be used together in a hybrid combination to generate forecasts.

It should be noted that FIGS. 4A-I discuss operations performed within an embodiment of the distributed processing system of FIG. 1A. However, just as with the operations discussed in reference to FIG. 3A-E, above, the operations discussed in reference to FIGS. 4A-I may alternately be performed within an embodiment of the processing system of FIG. 1B, with various ones of the different processing operations that are able to be performed at least partially in parallel being performed in a distributed manner among multiple processing cores 2551 and/or among multiple ones of the processor 2550 of the control device 2500.

Turning to FIG. 4A, and in a manner similar to what was depicted and discussed in reference to FIG. 3A, within the control device 2500 of an embodiment of the distributed processing system 2000 of FIG. 1A, a processing core 2551 may be caused by the execution of the acquisition component 2511 of the control routine 2510 to generate and transmit queries through the network 2999 to each of one or more of the data sources 2100 to retrieve one or more main data sets 3100$m$ and/or one or more supplemental data sets 3100$s$, or to cause the node devices 2300 to do so.

However, unlike the queries generated and transmitted in FIG. 3A, the queries generated and transmitted in FIG. 4A may include supplemental queries intended to cause the retrieval of at least supplemental data sets 3100$s$ that include topics related to the set of main topics (as discussed in reference to FIG. 3A) so as to broaden the selection of data sets 3100 that are retrieved beyond just the main data sets 3100$m$ that are retrieved for use in generating forecasts. It should be noted that such supplemental queries may be made along with the queries using keywords associated with the set of main topics to retrieve the main data sets 3100$m$, such that the supplemental data sets 3100$s$ and the main data sets 3100$m$ may be retrieved together. As with the queries for retrieving the main data sets 3100$m$, the supplemental queries for retrieving the supplemental data sets 3100$s$ may also make use of API set(s) 2195 supported by one or more of the data sources 2100.

Turning to FIG. 4B, along with FIG. 4A, in response to such queries, each of the node devices 2300 may be provided, through the network 2999, with at least portion(s) of one or more data sets 3100$m$ and/or 3100$s$. The queries transmitted to the data source(s) 2100 may each specify which one(s) of the node devices 2300 are to be provided with one or more data sets 3100$m$ and/or 3100$s$ in response.

As was discussed in reference to FIG. 3B, in FIG. 4B, within each of such node devices 2300, one or more processor cores 2531 of one or more processors 2530 are caused by the execution of the extraction component 2312 of the control routine 2310 to perform various pre-processing operations to extract main input data portions 3171$m$ of the main input data 3170$m$ that is to be used in generating a forecast, as previously discussed in reference to FIGS. 3C-E. However, in FIG. 4B, the supplemental data set(s) 3100$s$ may also be subjected to such pre-processing operations to similarly extract supplemental input data portions 3171s of what may later become the supplemental input data 3170s. Such extraction may be done in a distributed manner across multiple main data sets 3100m and/or 3100s, at least partially in parallel, and/or across multiple node devices 2300.

As also depicted in FIG. 4B, within each of such node devices 2300, execution of a prominence component 2342 of the control routine 2340 may cause processing core(s) 2351 of processor(s) 2350 of the node device 2300 to analyze the main input data portion 3171m and/or the supplemental input data portion 3171s to derive a level of prominence of each topic identified as present within each main data set 3100m and/or each supplemental data set 3100s. As will be familiar to those skilled in the art, a level of prominence for each topic may be derived using a variety of different measures, including and not limited to, a quantity of mentions of the topic in each data set 3100, an amount of text identified as associated with the topic in each data set 3100, etc. Regardless of the exact approach to determining levels of prominence for each topic within each data set 3100, a prominence data portion 3141 that includes indications of such levels of prominence may be generated within each node device 2300 for provision, via the network 2999, to the control device 2500 to be used in generating prominence data 3140 that is indicative of levels of prominence of topics across all of the data sets 3100 from which data has been extracted, and/or that is indicative of rates of increase in prominence of topics across all of such data sets 3100.

Turning to FIG. 4C, within the control device 2500, execution of a trend component 2544 of the control routine 2540 may cause processing core(s) 2551 of processor(s) 2550 to perform a multiple pass analysis of candidate topics to determine whether there is a new trending topic that exerts a significant enough influence on the accuracy of forecasts that are made based on the set of main topics as to warrant being added to the set of main topics. More specifically, indications of levels of prominence of topics and/or of rates of increase in prominence of topics indicated in the prominence data 3140 may be compared to minimum threshold(s) for such values indicated in the configuration data 2535. In a first pass of multiple passes, topics that are found to be sufficiently prominent and/or found to be increasing in prominence at a sufficient rate as to meet such threshold(s) may then be deemed to be candidate topics for consideration to be added to the set of main topics. It should be noted that, in various different embodiments, levels of prominence may be absolute levels of prominence (e.g., a quantity of mentions of a topic within a single data set 3100) or relative (e.g., relative sizes of portions of a data set 3100 determined to be associated with each topic).

In further executing the trend component 2544, processing core(s) 2551 may be caused to transmit a query to one or more of the data sources 2100 for information concerning the frequency with which each candidate topic (if there are any) is appearing in online searches (e.g., search requests made to one or more search engine websites on the Internet). It should be noted that such queries may be directed to the data source(s) 2100 in embodiments in which the data source(s) 2100 are in some way associated with such online search engine websites. However, it should be noted that it may be that such a query may be directed to an online search engine website that has no connection with any of the data sources 2100. Indications of the response(s) received to such queries concerning online searches may be stored within trend data 3144. More specifically, the trend data 3144 may store indications of the frequency with which each candidate topic is included in online searches (e.g., the trend level), and/or may store indications of the rate at which such a frequency is increasing (e.g., the rate of increase in trend level). In a second pass of multiple passes, candidate topics that are found to have a sufficiently high trend level and/or found to have a rate of increase in trend level as to meet such threshold(s) may then be deemed to be trending topics for consideration to be added to the set of main topics.

In still further executing the trend component 2544, processing core(s) 2551 may be caused to transmit a query to one or more of the data sources 2100 (and/or to one or more online search engine websites unassociated with the data sources 2100) for information concerning what keywords are most frequently used in online searches that include each trending topic (if there are any after the second pass). Indications of the response(s) received to such queries concerning online searches may be stored within trend data 3144. More specifically, the trend data 3144 may additionally store indications of such most frequently used keywords.

Turning to FIG. 4D, in a manner somewhat similar to what was depicted and discussed in reference to FIG. 4A, further execution of the acquisition component 2511 may cause processing core(s) 2551 of the processor(s) 2550 to generate and transmit queries through the network 2999 to each of one or more of the data sources 2100 to retrieve one or more additional main data sets 3100m and/or one or more supplemental data sets 3100s, or to cause the node devices 2300 to do so. However, unlike the queries generated and transmitted in FIG. 4A, the queries generated and transmitted in FIG. 4D may include queries that use the most frequently used keywords associated with the one or more trending topics (again, if there are any) to cause the retrieval of data sets 3100 that include the one or more trending topics. Again, it may be that API set(s) 2195 supported by one or more of the data sources 2100 are used.

Turning to FIG. 4E, along with FIG. 4D, in response to such queries, each of the node devices 2300 may be provided, through the network 2999, with at least portion(s) of one or more additional data sets 3100m and/or 3100s. Again, the queries transmitted to the data source(s) 2100 may each specify which one(s) of the node devices 2300 are to be provided with one or more data sets 3100m and/or 3100s in response.

In a manner similar to what was discussed in reference to FIG. 4B, in FIG. 4E, within each of such node devices 2300, one or more processor cores 2531 of one or more processors 2530 may be caused by the execution of the extraction component 2312 of the control routine 2310 to perform various pre-processing operations to extract more supplemental input data portions 3171s of what may later become more of the supplemental input data 3170s. Again, extraction may be done in a distributed manner across multiple main data sets 3100m and/or 3100s, at least partially in parallel, and/or across multiple node devices 2300. Unlike the retrieval of one or more supplemental data sets 3100s and the extraction of supplemental input data portions 3171s earlier discussed in reference to FIG. 4B, the retrieval of one or more supplemental data sets 3100s and the extraction of supplemental input data portions 3171s in FIG. 4E is associated with the use of the most frequently used keywords associated with a trending topic.

Also unlike the what was depicted and discussed in reference to FIG. 4B, one or more main data sets 3100m may be similarly subjected to such pre-processing operations to extract comparison data portions 3171c of what may then become the comparison data 3170c. Again, the comparison data 3170*c* may include data values of the subject about which forecasts are made. More specifically, the comparison data 3170*c* may include indications of what actually happened after each forecast was made, and may be periodically employed in comparisons to previous forecasts of what was predicted would happen to double-check the degree of forecast accuracy.

Turning to FIG. 4F, within the control device 2500, execution of a causation component 2545 of the control routine 2540 may cause processing core(s) 2551 of processor(s) 2550 to continue the aforedescribed multiple pass analysis to determine whether there is a new trending topic that exerts a significant enough effect on the accuracy of forecasts that are made based on the set of main topics as to warrant being added to the set of main topics. More specifically, indications in the comparison data 3170*c* may be compared to at least a portion of the supplemental input data 3170*s* that is extracted from data sets 3100 retrieved using the most frequently used keywords associated with each trending topic. This comparison may be made as part of an analysis to determine whether there is a causal relationship between each of the trending topics and the subject about which forecasts are made. If it is determined that there is enough of a causal relationship between a trending topic and the forecasts that are made as to meet a threshold degree of causal relationship, then such a trending topic may be deemed to be a significant trending topic having the ability to influence forecast accuracy to a sufficient degree as to warrant being added to the set of main topics on which forecasts are based.

In executing the preparation component 2546, and in response to a determination that a trending topic is a sufficiently significant trending topic as to warrant being added to the set of main topics, processing core(s) 2551 of processor(s) 2550 of the control device 2500 may be caused to update the configuration data 2535 to reflect the addition of the newly identified significant trending topic as another main topic in the set of main topics. In so updating the configuration data 2535, the keywords used in retrieving data sets 3100 that include each of the main topics in the set of main topics may be augmented to now also include the keywords found to be the ones most frequently used for the newly added trending topic (now a newly added main topic to the set of main topics). Additionally, the processing core(s) 2551 may generate training data 3440 and/or testing data 3444 from differing combinations of the main input data 3170*m*, the supplemental input data 3170*s* associated with the newly added main topic, and the comparison data 3170*c*. As depicted, the configuration data 2535 may include specifications of one or more rules for the generation of the training data 3440 and/or the testing data 3444 (e.g., size of each, range of time to be covered, etc.).

Turning to FIG. 4G, further execution of the preparation component 2546 of the control routine 2540 may cause processing core(s) 2551 of processor(s) 2550 of the control device 2500 to coordinate the training and/or testing of multiple new forecast models 3470*n*. More specifically, different existing forecast models 3470*e* may be distributed to different ones of the node devices 2300 through the network 2999, along with corresponding ones of the model templates 3435, and copies of the training data 3440 and/or the testing data 3444.

Turning to FIG. 4H, within each node device 2300, execution of a training component 2347 of the control routine 2340 may cause processing core(s) 2351 of processor(s) 2350 of the node device 2300 to use the training data 3440 to generate new forecast model(s) 3470*n*, and/or to use the testing data 3440 to test new forecast model(s) 3470*n* as part of determining which one(s) are to be used in making forecasts. As previously discussed, it may be that there is a model template 3435 for each forecast model 3470 to at least assist in the use of that corresponding forecast model 3470 by providing various details about that corresponding forecast model 3470.

In some embodiments, it may be that each model template 3435 provides a complete enough set of information concerning its corresponding forecast model 3470 that each model template 3435 may effectively be a representation of its corresponding forecast model 3470 in its untrained form (e.g., including hyperparameters, but not parameters indicative of learned aspects), while its corresponding forecast model 3470 is a representation of a trained form thereof. In such embodiments, the training of a new forecast model 3470*n* to replace a corresponding existing forecast model 3470*e* may entail using the information within the corresponding model template 3435 that defines the untrained version thereof along with the training data 3440 to generate a trained version thereof as the new forecast model 3470*n*.

In other embodiments, it may be that each model template 3435 provides less than a complete enough set of information concerning its corresponding forecast model 3470 such that none of the model templates 3435 may be deemed a representation of its corresponding forecast model 3470 in its untrained form. In such embodiments, the training of a new forecast model 3470*n* to replace a corresponding existing forecast model 3470*e* may entail extracting indications of various aspects of an untrained form thereof from the existing forecast model 3470*e*, and using those indications along with the training data 3440 to generate a new trained version thereof as the new forecast model 3470*n*.

Regardless of the exact manner in which the necessary information for the training of new forecast models 3470*n* is provided, the generation of each new forecast model 3470*n* may be followed by the testing thereof using the testing data 3444 to determine the degree of forecast accuracy of each. Further, in a manner similar to the use of forecast models 3470 depicted and discussed in FIG. 3D, in some embodiments, and depending on the type of ML technology that is used by each forecast model 3470 and that is supported by the neuromorphic device(s) 2355, it may be that the neuromorphic devices 2355 are employed in training and/or testing at least a subset of the new forecast models 3470*n*. As further depicted, following such training and/or testing of each of the new forecast model(s) 3470*n*, those new forecast model(s) 3470*n* may be provide to the control device 2500 via the network 2999, along with an indication of the forecast accuracy for each.

Turning to FIG. 4I, execution of a selection component 2548 of the control routine 2540 may cause processing core(s) 2551 of processor(s) 2550 of the control device 2500 to analyze indications of degree of forecast accuracy of each new forecast model 3470*n* to select either a single new forecast model 3470*n* to make forecasts, or a subset of the new forecast models 3470*n* to serve as a hybrid combination to make forecasts. Regardless of whether a single forecast model 3470*n* is selected, or multiple ones thereof, the indication of the selection of which one or more of the new forecast models 3470 that are to be used in making forecasts may be updated in the configuration data 2535.

In various embodiments, each of the processors 2350, 2550 and 2750 may include any of a wide variety of commercially available processors. Further, one or more of these processors may include multiple processors, a multi-threaded processor, a multi-core processor (whether the multiple cores coexist on the same or separate dies), and/or a multi-processor architecture of some other variety by which multiple physically separate processors are linked.

However, in a specific embodiment, the processor(s) 2350 of each of the one or more node devices 2300 may be selected to efficiently perform the analysis of multiple instances of pre-processing, processing and/or post-processing operations at least partially in parallel. By way of example, the processors 2350 may incorporate a single-instruction multiple-data (SIMD) architecture, may incorporate multiple processing pipelines, and/or may incorporate the ability to support multiple simultaneous threads of execution per processing pipeline. Alternatively or additionally by way of example, the processor 1550 may incorporate multi-threaded capabilities and/or multiple processor cores to enable parallel performances of the tasks of more than job flow.

In various embodiments, each of the control routines 2310, 2340, 2370, 2510, 2540, 2570 and 2770, including the components of which each is composed, may be selected to be operative on whatever type of processor or processors that are selected to implement applicable ones of the processors 2350, 2550 and/or 2750 within each one of the devices 2300, 2500 and/or 2700, respectively. In various embodiments, each of these routines may include one or more of an operating system, device drivers and/or application-level routines (e.g., so-called "software suites" provided on disc media, "applets" obtained from a remote server, etc.). Where an operating system is included, the operating system may be any of a variety of available operating systems appropriate for the processors 2350, 2550 and/or 2750. Where one or more device drivers are included, those device drivers may provide support for any of a variety of other components, whether hardware or software components, of the devices 2300, 2500 and/or 2700.

In various embodiments, each of the storages 2360, 2560 and 2760 may be based on any of a wide variety of information storage technologies, including volatile technologies requiring the uninterrupted provision of electric power, and/or including technologies entailing the use of machine-readable storage media that may or may not be removable. Thus, each of these storages may include any of a wide variety of types (or combination of types) of storage device, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, non-volatile storage class memory, or a plurality of storage devices organized into one or more arrays (e.g., multiple ferromagnetic disk drives organized into a Redundant Array of Independent Disks array, or RAID array). It should be noted that although each of these storages is depicted as a single block, one or more of these may include multiple storage devices that may be based on differing storage technologies. Thus, for example, one or more of each of these depicted storages may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid state memory devices enabling relatively quick access to programs and/or data (e.g., SRAM or DRAM). It should also be noted that each of these storages may be made up of multiple storage components based on identical storage technology, but which may be maintained separately as a result of specialization in use (e.g., some DRAM devices employed as a main storage while other DRAM devices employed as a distinct frame buffer of a graphics controller).

However, in a specific embodiment, the storage 2560 in embodiments in which the one or more of the federated devices 2500 provide federated spaces 2566, or the storage devices 2600 in embodiments in which the one or more storage devices 2600 provide federated spaces 2566, may be implemented with a redundant array of independent discs (RAID) of a RAID level selected to provide fault tolerance to objects stored within the federated spaces 2566.

In various embodiments, the input device 2720 may be any of a variety of types of input device that may each employ any of a wide variety of input detection and/or reception technologies. Examples of such input devices include, and are not limited to, microphones, remote controls, stylus pens, card readers, finger print readers, virtual reality interaction gloves, graphical input tablets, joysticks, keyboards, retina scanners, the touch input components of touch screens, trackballs, environmental sensors, and/or either cameras or camera arrays to monitor movement of persons to accept commands and/or data provided by those persons via gestures and/or facial expressions.

In various embodiments, the display 2780 may be any of a variety of types of display device that may each employ any of a wide variety of visual presentation technologies. Examples of such a display device includes, and is not limited to, a cathode-ray tube (CRT), an electroluminescent (EL) panel, a liquid crystal display (LCD), a gas plasma display, etc. In some embodiments, the display 2780 may be a touchscreen display such that the input device 2720 may be incorporated therein as touch-sensitive components thereof.

In various embodiments, each of the network interfaces 2390, 2590 and 2790 may employ any of a wide variety of communications technologies enabling these devices to be coupled to other devices as has been described. Each of these interfaces includes circuitry providing at least some of the requisite functionality to enable such coupling. However, each of these interfaces may also be at least partially implemented with sequences of instructions executed by corresponding ones of the processors (e.g., to implement a protocol stack or other features). Where electrically and/or optically conductive cabling is employed, these interfaces may employ timings and/or protocols conforming to any of a variety of industry standards, including without limitation, RS-232C, RS-422, USB, Ethernet (IEEE-802.3) or IEEE-1394. Where the use of wireless transmissions is entailed, these interfaces may employ timings and/or protocols conforming to any of a variety of industry standards, including without limitation, IEEE 802.11a, 802.11ad, 802.11ah, 802.11ax, 802.11b, 802.11g, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1xRTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, 5G, etc.

However, in a specific embodiment, one or more of the network interfaces 2390 and/or 2590 may be implemented with multiple copper-based or fiber-optic based network interface ports to provide redundant and/or parallel pathways in exchanging at least the data sets 3100.

In various embodiments, API sets 2195 may be configured to and/or selected to conform to any of a variety of standards for distributed processing, including without limitation, IEEE P2413, AllJoyn, IoTivity, etc. By way of example, a subset of API and/or other architectural features of one or more of such standards may be employed to implement the relatively minimal degree of coordination described herein to provide greater efficiency in parallelizing processing of data, while minimizing exchanges of coordinating information that may lead to undesired instances of serialization among processes. However, it should be noted that the parallelization of storage, retrieval and/or processing of portions of the data sets 3100 are not dependent on, nor constrained by, existing API architectures and/or supporting communications protocols. More broadly, there is nothing in the manner in which the data sets 3100 may be organized in storage, transmission and/or distribution via the network 2999 that is bound to existing API architectures or protocols.

Some systems may use Hadoop®, an open-source framework for storing and analyzing big data in a distributed computing environment. Some systems may use cloud computing, which can enable ubiquitous, convenient, on-demand network access to a shared pool of configurable computing resources (e.g., networks, servers, storage, applications and services) that can be rapidly provisioned and released with minimal management effort or service provider interaction. Some grid systems may be implemented as a multi-node Hadoop® cluster, as understood by a person of skill in the art. Apache™ Hadoop® is an open-source software framework for distributed computing.

The invention claimed is:

1. An apparatus comprising at least one processor and a storage to store instructions that, when executed by the at least one processor, cause the at least one processor to perform operations comprising:
    retrieve, from at least one data source device via a network, at least one main data set that includes main input data associated with a pre-selected set of main topics;
    analyze the at least one main data set to identify a candidate topic present within the at least one main data set, wherein:
        the candidate topic is not included in the set of main topics; and
        at least one existing forecast model is trained to use the main input data to generate a forecast concerning a pre-selected subject;
    analyze the at least one data set to determine whether a level of prominence of the candidate topic within the at least one data set meets a pre-determined minimum threshold level of prominence;
    in response to at least the level of prominence meeting a minimum threshold level of prominence, retrieve, via the network and from another device that performs online searches, an indication of a rate of increase in frequency with which the candidate topic is included in the online searches;
    in response to the rate of increase meeting a pre-determined minimum threshold rate of increase in frequency, perform operations comprising:
        retrieve, via the network and from the other device, an indication of a supplemental keyword most frequently used in the online searches for the candidate topic;
        use the supplemental keyword to retrieve, from the at least one data source device via the network, at least one supplemental data set that includes the candidate topic;
        extract supplemental input data associated with the candidate topic from the at least one supplemental data set; and
        analyze the supplemental input data together with observations of a level of forecast accuracy of the at least one existing forecast model to determine whether the candidate topic is able to change the level of forecast accuracy; and
    in response to a determination that the candidate topic is able to change the level of forecast accuracy, perform operations comprising:
        add the candidate topic to the set of main topics; and
        replace the at least one existing forecast model with at least one new forecast model trained to use the main input data augmented with the supplemental input data to generate a new forecast concerning the pre-selected subject.

2. The apparatus of claim 1, wherein, to retrieve the at least one main data set from the at least one data source device, the at least one processor is caused to perform operations comprising:
    generate a query comprising a set of main keywords, wherein each main keyword of the set of main keywords is identified as most frequently used in online searches for a corresponding main topic of the set of main topics; and
    transmit the query to the at least one data source device via the network to cause provision of the at least one main data set from the at least one data source device via the network.

3. The apparatus of claim 2, wherein, to add the candidate topic to the set of main topics, the at least one processor is caused to add the supplemental keyword to the set of main keywords prior to generation of another query comprising the set of main keywords augmented with the supplemental keyword in support of generating the new forecast.

4. The apparatus of claim 1, wherein:
    for each main topic of the set of main topics, the main input data comprises indications of changes in at least one data value associated with the main topic over a first period of time; and
    the forecast comprises indications of corresponding changes in at least one data value associated with the pre-selected subject over a second period of time that occurs later than the first period of time.

5. The apparatus of claim 4, wherein the forecast comprises a time series that covers the second period of time.

6. The apparatus of claim 1, wherein, to analyze the at least one data set to determine whether the level of prominence of the candidate topic meets the minimum threshold level of prominence, the at least one processor is caused to:
    determine a quantity of mentions of the candidate topic;
    determine a proportion of text data associated with the candidate topic; or
    perform operations comprising:
        use an application programming interface (API) provided by the at least one data source device to generate a query to cause the at least one data source device to analyze the at least one data set to determine the level of prominence of the candidate topic within the at least one main data set; and
        transmit the query to the at least one data source device via the network.

7. The apparatus of claim 1, wherein:
to retrieve, from the other device, the indication of the rate of increase in frequency with which the candidate topic is included in the online searches, the at least one processor is caused to perform operations comprising:
  use an application programming interface (API) provided by the other device to generate a query to cause the other device to analyze the online searches over a specified period of time to derive the rate of increase in frequency over the specified period of time; and
  transmit the query to the other device via the network; and
to retrieve, from the other device, the indication of the supplemental keyword, the at least one processor is caused to perform operations comprising:
  use the API to generate another query to cause the other device to analyze the online searches over the specified period of time to identify the supplemental keyword; and
  transmit the other query to the other device via the network.

8. The apparatus of claim 1, wherein, to replace the at least one existing forecast model with the at least one new forecast model, the at least one processor is caused to perform operations comprising:
  generate training data from first portions of the main input data, the supplemental input data and corresponding observations of data values associated with the pre-selected subject;
  use the training data to train a plurality of new forecast models as an ensemble of new forecast models;
  generate testing data from second portions of the main input data, the supplemental input data and corresponding observations of data values associated with the pre-selected subject;
  use the testing data to test the forecast accuracy of each new forecast model of the plurality of new forecast models; and
  select the at least one new forecast model from among the plurality of new forecast models based on the forecast accuracy of each new forecast model.

9. The apparatus of claim 8, wherein:
each new forecast model of the plurality of forecast models employs machine learning technology comprising at least one of:
  a neural network;
  a variational encoder;
  a generative adversarial network;
  learning automata based on stochastic matrices; or
  an evolutionary algorithm based on randomly generated portions of executable instructions; and
to select the at least one new forecast model, the at least one processor is caused to perform operations comprising:
  compare the forecast accuracy of each new forecast model of the plurality of new forecast models to a pre-determined minimum threshold level of forecast accuracy; and
  select multiple new forecast models from among the plurality of new forecast models to be used together as a hybrid combination of new forecast models to generate the new forecast.

10. The apparatus of claim 1, wherein:
each main data set of the at least one main data set comprises at least one of:
  one or more text documents;
  one or more speech recordings;
  one or more multi-dimensional data structures; or
  one or more indexing schemes to enable access to data values; and
to analyze the at least one main data set to identify the candidate topic, the at least one processor is caused to:
  perform at least one natural language processing operation that comprises at least one of:
    tokenization;
    lemmatization;
    latent Dirichlet allocation (LDA); or
    stop word removal; or
  perform at least one pre-processing operation that comprises at least one of:
    data cleaning;
    scaling;
    data format conversion;
    data type conversion; or
    data value normalization.

11. A computer-program product tangibly embodied in a non-transitory machine-readable storage medium, the computer-program product including instructions operable to cause at least one processor to perform operations comprising:
  retrieve, from at least one data source device via a network, at least one main data set that includes main input data associated with a pre-selected set of main topics;
  analyze the at least one main data set to identify a candidate topic present within the at least one main data set, wherein:
    the candidate topic is not included in the set of main topics; and
    at least one existing forecast model is trained to use the main input data to generate a forecast concerning a pre-selected subject;
  analyze the at least one data set to determine whether a level of prominence of the candidate topic within the at least one data set meets a pre-determined minimum threshold level of prominence;
  in response to at least the level of prominence meeting a minimum threshold level of prominence, retrieve, via the network and from another device that performs online searches, an indication of a rate of increase in frequency with which the candidate topic is included in the online searches;
  in response to the rate of increase meeting a pre-determined minimum threshold rate of increase in frequency, perform operations comprising:
    retrieve, via the network and from the other device, an indication of a supplemental keyword most frequently used in the online searches for the candidate topic;
    use the supplemental keyword to retrieve, from the at least one data source device via the network, at least one supplemental data set that includes the candidate topic;
    extract supplemental input data associated with the candidate topic from the at least one supplemental data set; and
    analyze the supplemental input data together with observations of a level of forecast accuracy of the at least one existing forecast model to determine whether the candidate topic is able to change the level of forecast accuracy; and in response to a determination that the candidate topic is able to change the level of forecast accuracy, perform operations comprising:
add the candidate topic to the set of main topics; and
replace the at least one existing forecast model with at least one new forecast model trained to use the main input data augmented with the supplemental input data to generate a new forecast concerning the pre-selected subject.

12. The computer-program product of claim 11, wherein, to retrieve the at least one main data set from the at least one data source device, the at least one processor is caused to perform operations comprising:
generate a query comprising a set of main keywords, wherein each main keyword of the set of main keywords is identified as most frequently used in online searches for a corresponding main topic of the set of main topics; and
transmit the query to the at least one data source device via the network to cause provision of the at least one main data set from the at least one data source device via the network.

13. The computer-program product of claim 12, wherein, to add the candidate topic to the set of main topics, the at least one processor is caused to add the supplemental keyword to the set of main keywords prior to generation of another query comprising the set of main keywords augmented with the supplemental keyword in support of generating the new forecast.

14. The computer-program product of claim 11, wherein:
for each main topic of the set of main topics, the main input data comprises indications of changes in at least one data value associated with the main topic over a first period of time; and
the forecast comprises indications of corresponding changes in at least one data value associated with the pre-selected subject over a second period of time that occurs later than the first period of time.

15. The computer-program product of claim 14, wherein the forecast comprises a time series that covers the second period of time.

16. The computer-program product of claim 11, wherein, to analyze the at least one data set to determine whether the level of prominence of the candidate topic meets the minimum threshold level of prominence, the at least one processor is caused to:
determine a quantity of mentions of the candidate topic;
determine a proportion of text data associated with the candidate topic; or
perform operations comprising:
use an application programming interface (API) provided by the at least one data source device to generate a query to cause the at least one data source device to analyze the at least one data set to determine the level of prominence of the candidate topic within the at least one main data set; and
transmit the query to the at least one data source device via the network.

17. The computer-program product of claim 11, wherein:
to retrieve, from the other device, the indication of the rate of increase in frequency with which the candidate topic is included in the online searches, the at least one processor is caused to perform operations comprising:
use an application programming interface (API) provided by the other device to generate a query to cause the other device to analyze the online searches over a specified period of time to derive the rate of increase in frequency over the specified period of time; and
transmit the query to the other device via the network; and
to retrieve, from the other device, the indication of the supplemental keyword, the at least one processor is caused to perform operations comprising:
use the API to generate another query to cause the other device to analyze the online searches over the specified period of time to identify the supplemental keyword; and
transmit the other query to the other device via the network.

18. The computer-program product of claim 11, wherein, to replace the at least one existing forecast model with the at least one new forecast model, the at least one processor is caused to perform operations comprising:
generate training data from first portions of the main input data, the supplemental input data and corresponding observations of data values associated with the pre-selected subject;
use the training data to train a plurality of new forecast models as an ensemble of new forecast models;
generate testing data from second portions of the main input data, the supplemental input data and corresponding observations of data values associated with the pre-selected subject;
use the testing data to test the forecast accuracy of each new forecast model of the plurality of new forecast models; and
select the at least one new forecast model from among the plurality of new forecast models based on the forecast accuracy of each new forecast model.

19. The computer-program product of claim 18, wherein:
each new forecast model of the plurality of forecast models employs machine learning technology comprising at least one of:
a neural network;
a variational encoder;
a generative adversarial network;
learning automata based on stochastic matrices; or
an evolutionary algorithm based on randomly generated portions of executable instructions; and
to select the at least one new forecast model, the at least one processor is caused to perform operations comprising:
compare the forecast accuracy of each new forecast model of the plurality of new forecast models to a pre-determined minimum threshold level of forecast accuracy; and
select multiple new forecast models from among the plurality of new forecast models to be used together as a hybrid combination of new forecast models to generate the new forecast.

20. The computer-program product of claim 11, wherein:
each main data set of the at least one main data set comprises at least one of:
one or more text documents;
one or more speech recordings;
one or more multi-dimensional data structures; or
one or more indexing schemes to enable access to data values; and
to analyze the at least one main data set to identify the candidate topic, the at least one processor is caused to:

perform at least one natural language processing operation that comprises at least one of:
tokenization;
lemmatization;
latent Dirichlet allocation (LDA); or
stop word removal; or
perform at least one pre-processing operation that comprises at least one of:
data cleaning;
scaling;
data format conversion;
data type conversion; or
data value normalization.

21. A computer-implemented method comprising:
retrieving, by at least one processor, and from at least one data source device via a network, at least one main data set that includes main input data associated with a pre-selected set of main topics;
analyzing, by the at least one processor, the at least one main data set to identify a candidate topic present within the at least one main data set, wherein:
the candidate topic is not included in the set of main topics; and
at least one existing forecast model is trained to use the main input data to generate a forecast concerning a pre-selected subject;
analyzing, by the at least one processor, the at least one data set to determine whether a level of prominence of the candidate topic within the at least one data set meets a pre-determined minimum threshold level of prominence;
in response to at least the level of prominence meeting a minimum threshold level of prominence, retrieving, via the network and from another device that performs online searches, an indication of a rate of increase in frequency with which the candidate topic is included in the online searches;
in response to the rate of increase meeting a pre-determined minimum threshold rate of increase in frequency, performing operations comprising:
retrieving, via the network and from the other device, an indication of a supplemental keyword most frequently used in the online searches for the candidate topic;
using, by the at least one processor, the supplemental keyword to retrieve, from the at least one data source device via the network, at least one supplemental data set that includes the candidate topic;
extracting, by the at least one processor, supplemental input data associated with the candidate topic from the at least one supplemental data set; and
analyzing, by the at least one processor, the supplemental input data together with observations of a level of forecast accuracy of the at least one existing forecast model to determine whether the candidate topic is able to change the level of forecast accuracy; and
in response to a determination that the candidate topic is able to change the level of forecast accuracy, performing operations comprising:
adding the candidate topic to the set of main topics; and
replacing the at least one existing forecast model with at least one new forecast model trained to use the main input data augmented with the supplemental input data to generate a new forecast concerning the pre-selected subject.

22. The computer-implemented method of claim 21, wherein retrieving the at least one main data set from the at least one data source device comprises performing operations comprising:
generating, by the at least one processor, a query comprising a set of main keywords, wherein each main keyword of the set of main keywords is identified as most frequently used in online searches for a corresponding main topic of the set of main topics; and
transmitting the query to the at least one data source device via the network to cause provision of the at least one main data set from the at least one data source device via the network.

23. The computer-implemented method of claim 22, wherein adding the candidate topic to the set of main topics comprises adding the supplemental keyword to the set of main keywords prior to generation of another query comprising the set of main keywords augmented with the supplemental keyword in support of generating the new forecast.

24. The computer-implemented method of claim 21, wherein:
for each main topic of the set of main topics, the main input data comprises indications of changes in at least one data value associated with the main topic over a first period of time; and
the forecast comprises indications of corresponding changes in at least one data value associated with the pre-selected subject over a second period of time that occurs later than the first period of time.

25. The computer-implemented method of claim 24, wherein the forecast comprises a time series that covers the second period of time.

26. The computer-implemented method of claim 21, wherein analyzing the at least one data set to determine whether the level of prominence of the candidate topic meets the minimum threshold level of prominence comprises:
determining, by the at least one processor, a quantity of mentions of the candidate topic;
determining, by the at least one processor, a proportion of text data associated with the candidate topic; or
performing operations comprising:
using, by the at least one processor, an application programming interface (API) provided by the at least one data source device to generate a query to cause the at least one data source device to analyze the at least one data set to determine the level of prominence of the candidate topic within the at least one main data set; and
transmitting the query to the at least one data source device via the network.

27. The computer-implemented method of claim 21, wherein:
retrieving, from the other device, the indication of the rate of increase in frequency with which the candidate topic is included in the online searches comprises performing operations comprising:
using, by the at least one processor, an application programming interface (API) provided by the other device to generate a query to cause the other device to analyze the online searches over a specified period of time to derive the rate of increase in frequency over the specified period of time; and
transmitting the query to the other device via the network; and retrieving, from the other device, the indication of the supplemental keyword comprises performing operations comprising:
  using, by the at least one processor, the API to generate another query to cause the other device to analyze the online searches over the specified period of time to identify the supplemental keyword; and
  transmitting the other query to the other device via the network.

28. The computer-implemented method of claim 21, wherein replacing the at least one existing forecast model with the at least one new forecast model comprises performing operations comprising:
  generating, by the at least one processor, training data from first portions of the main input data, the supplemental input data and corresponding observations of data values associated with the pre-selected subject;
  using, by the at least one processor, the training data to train a plurality of new forecast models as an ensemble of new forecast models;
  generating, by the at least one processor, testing data from second portions of the main input data, the supplemental input data and corresponding observations of data values associated with the pre-selected subject;
  using, by the at least one processor, the testing data to test the forecast accuracy of each new forecast model of the plurality of new forecast models; and
  selecting, by the at least one processor, the at least one new forecast model from among the plurality of new forecast models based on the forecast accuracy of each new forecast model.

29. The computer-implemented method of claim 28, wherein:
  each new forecast model of the plurality of forecast models employs machine learning technology comprising at least one of:
    a neural network;
    a variational encoder;
    a generative adversarial network;
    learning automata based on stochastic matrices; or
    an evolutionary algorithm based on randomly generated portions of executable instructions; and
  to select the at least one new forecast model, the at least one processor is caused to perform operations comprising:
    compare the forecast accuracy of each new forecast model of the plurality of new forecast models to a pre-determined minimum threshold level of forecast accuracy; and
    select multiple new forecast models from among the plurality of new forecast models to be used together as a hybrid combination of new forecast models to generate the new forecast.

30. The computer-implemented method of claim 21, wherein:
  each main data set of the at least one main data set comprises at least one of:
    one or more text documents;
    one or more speech recordings;
    one or more multi-dimensional data structures; or
    one or more indexing schemes to enable access to data values; and
  analyzing the at least one main data set to identify the candidate topic comprises:
    performing, by the at least one processor, at least one natural language processing operation that comprises at least one of:
      tokenization;
      lemmatization;
      latent Dirichlet allocation (LDA); or
      stop word removal; or
    performing, by the at least one processor, at least one pre-processing operation that comprises at least one of:
      data cleaning;
      scaling;
      data format conversion;
      data type conversion; or
      data value normalization.

* * * * *